(12) United States Patent
Kodama et al.

(10) Patent No.: US 11,805,720 B2
(45) Date of Patent: Nov. 7, 2023

(54) AUTOMATIC TRAVEL SYSTEM FOR WORK VEHICLE

(71) Applicant: Yanmar Power Technology Co., Ltd., Osaka (JP)

(72) Inventors: Maroi Kodama, Osaka (JP); Yasuto Nishii, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 0 days.

(21) Appl. No.: 17/777,951

(22) PCT Filed: Oct. 15, 2020

(86) PCT No.: PCT/JP2020/038920
§ 371 (c)(1),
(2) Date: May 18, 2022

(87) PCT Pub. No.: WO2021/100373
PCT Pub. Date: May 27, 2021

(65) Prior Publication Data
US 2023/0031053 A1    Feb. 2, 2023

(30) Foreign Application Priority Data
Nov. 20, 2019    (JP) .................... 2019-209452

(51) Int. Cl.
| | |
|---|---|
| *A01B 69/04* | (2006.01) |
| *B62D 6/00* | (2006.01) |
| *G05D 1/02* | (2020.01) |
| *B62D 15/02* | (2006.01) |

(52) U.S. Cl.
CPC .............. *A01B 69/008* (2013.01); *B62D 6/00* (2013.01); *B62D 15/025* (2013.01); *G05D 1/0278* (2013.01); *G05D 2201/0201* (2013.01)

(58) Field of Classification Search
None
See application file for complete search history.

(56) References Cited

U.S. PATENT DOCUMENTS

| | | | | |
|---|---|---|---|---|
| 9,746,854 B2 * | 8/2017 | Berkemeier | ......... | G05D 1/0274 |
| 10,813,267 B2 * | 10/2020 | Shinkai | ............... | G05D 1/0278 |

\* cited by examiner

*Primary Examiner* — Todd Melton
(74) *Attorney, Agent, or Firm* — Chris Mizumoto

(57) ABSTRACT

Provided is an automatic travel system for a work vehicle, wherein: a control unit that causes the work vehicle to automatically travel according to a target path includes a target position setting unit that sets a target travel position to a predetermined position separated by a predetermined distance in an advancing direction from a current position of the work vehicle, and an automatic steering controller that controls operations of a steering unit so that that work vehicle follows the target travel position; and the target position setting unit determines whether the target travel position has reached an end position of a turning path connected to a straight path and, if a determination is made that the target travel position has reached the end position of the turning path, then changes the setting of the target travel position from the position on the turning path to a position on the straight path.

3 Claims, 14 Drawing Sheets

AUTOMATIC TRAVEL SYSTEM FOR WORK VEHICLE

CROSS-REFERENCE

This application is a national phase of an international application, PCT/JP2020/038920 filed on Oct. 15, 2020, which claims the benefit of Japanese Application No. 2019-209452, filed on Nov. 20, 2019.

TECHNICAL FIELD

The present invention relates to an automatic travel system for a work vehicle that enables automatic travel of the work vehicle.

BACKGROUND ART

In an example of such an automatic travel system for a work vehicle, a system is configured such that a target travel position is set, during automatic travel of the work vehicle, at a position on a target path or an extension of the target path at a predetermined distance from the current position of the work vehicle in the traveling direction, and the work vehicle is made to travel automatically to follow the target travel position so that the work vehicle travels automatically along target path (see, for example, Patent Literature 1).

CITATION LIST

Patent Literature

Patent Literature 1: Japanese Unexamined Patent Publication No. 2019-53470

DISCLOSURE OF INVENTION

Problems to be Solved by the Invention

In the automatic travel system for a work vehicle described in Patent Literature 1, the target path is divided into a plurality of types of path sections, and until the current position of the work vehicle switches from the current path section to the next path section of a different type, the target travel position is set on the current path section or at a position on the extension of the current path section.

In other words, in the automatic travel system for a work vehicle described in Patent Literature 1, when the current position of the work vehicle is on a turning path for turning the work vehicle and the next path section is a straight path for traveling the work vehicle in a straight line, the target travel position is set on the position on the turning path or on the extension of the turning path until the current position of the work vehicle switches from the turning path to the straight path, so that the work vehicle follows the target travel position set on the turning path or on the extension of the turning path.

Therefore, at a point where the work vehicle reaches an end position of the turning path (or a start position of the straight path), the steering wheel of the work vehicle is in a largely steered state toward the inside of the turn. To make the work vehicle in such a state follow the target travel position changed to a position on the straight path, the work vehicle should return to the straight path after biased traveling toward the inside of a turn relative to the azimuth of the straight path. As a result, the work vehicle cannot travel automatically and accurately along the straight path for a while after the work vehicle reaches the start position of the straight path.

In view of the above situation, it is an object of the present invention to make a work vehicle travel automatically and accurately from a switching position along a straight path, when a travel path of the work vehicle switches from a turning path to the straight path.

Means for Solving the Problems

According to a first aspect of the present invention, an automatic travel system for a work vehicle includes a steering unit that operates a traveling device provided in the work vehicle, a positioning unit that measures a current position and a current azimuth of the work vehicle, and a control unit that makes the work vehicle travel automatically along a preset target path in accordance with positioning information from the positioning unit, in which the target path includes a turning path and a straight path connected to the turning path, the control unit includes a target position setting unit that sets a target travel position at a predetermined position at a predetermined distance from the current position in a traveling direction during automatic travel, and an automatic steering control unit that controls an operation of the steering unit to allow the work vehicle to follow the target travel position in accordance with the positioning information from the positioning unit and the target travel position, and the target position setting unit determines whether the target travel position has reached an end of the turning path connected to the straight path, and when it is determined that the target travel position has reached the end of the turning path, the target position setting unit changes a setting of the target travel position from a position on the turning path to a position on the straight path.

With the present structure, when it is determined that the target travel position has reached the end position of the turning path and the target position setting unit changes the setting of the target travel position from the position on the turning path to the position on the straight path, the automatic steering control unit controls the operation of the steering unit so that the work vehicle follows the target travel position set on the straight path.

Accordingly, the work vehicle can start to follow the target travel position set at the position on the straight path at a point where the work vehicle is located at a position on the turning path at a predetermined distance toward the near side from the end position of the turning path (start position of the straight path).

This facilitates adjustment of the azimuth of the work vehicle to the azimuth of the straight path at a point where the work vehicle reaches the start position of the straight path, thus enabling the work vehicle to travel automatically and accurately along the straight path from a point where the work vehicle reaches the start position of the straight path.

DESCRIPTION OF EMBODIMENTS

In the following, an embodiment in which the automatic travel system for a work vehicle according to the present invention is applied to a tractor will be described, with reference to the accompanying drawings, as an example of a mode for implementing the present invention.

In addition to tractors, the automatic travel system for a work vehicle according to the present invention can be applied, for example, to passenger work vehicles that can travel automatically, such as passenger management machines, passenger mowers, passenger rice transplanters, combine harvesters, snow plows, wheel loaders, and transport vehicles, as well as unmanned work vehicles such as unmanned tillers and unmanned mowers.

Figure 1:
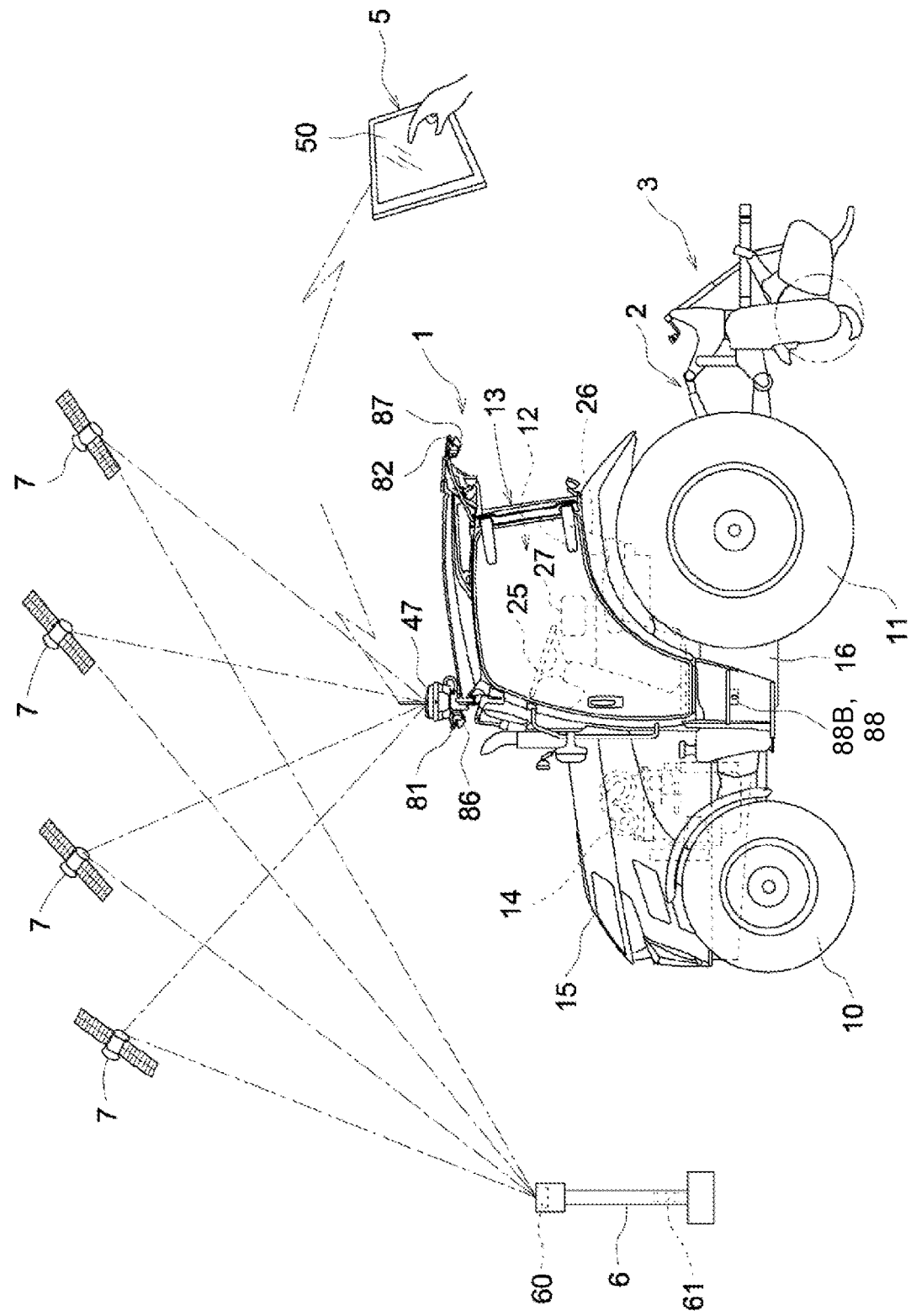
FIG. 1 illustrates a schematic configuration of an automatic travel system for a work vehicle.

As illustrated in FIG. 1, a tractor 1 illustrated in the present embodiment is coupled with a rotary tiller 3, which is an example of the work device, connected to the rear part of the tractor 1 via a link mechanism 2 to allow lifting and rolling of the rotary tiller 3. Thus, the tractor 1 is configured in a rotary tilling specification.

Instead of the rotary tiller 3, other work devices can be connected to the rear part of the tractor 1, such as, for example, a plow, a disc harrow, a cultivator, a subsoiler, a seeder, a spraying device, a mower, and a harvester.

Figure 2:
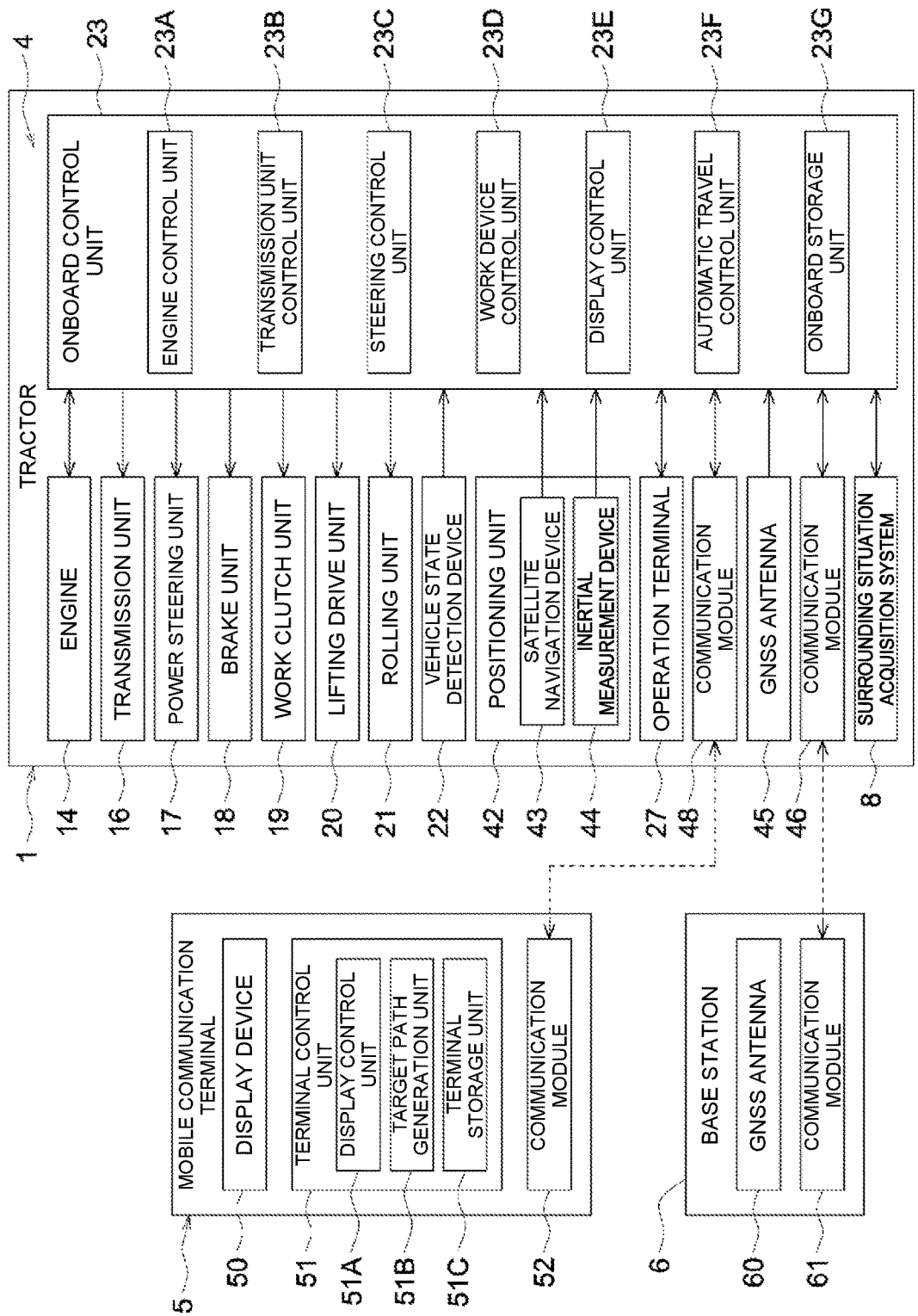
FIG. 2 is a block diagram illustrating a schematic configuration of the automatic travel system for a work vehicle.

The tractor 1 can travel automatically in a field A (see FIG. 5), which is an example of a work area, using an automatic travel system for work vehicles. As illustrated in FIGS. 1 and 2, an automatic travel system for a work vehicle includes, for example, an automatic travel unit 4 mounted on the tractor 1, and a mobile communication terminal 5 which is an example of a wireless communication device set up for communication to enable wireless communicable with the automatic travel unit 4. The mobile communication terminal 5 includes a multi-touch display device 50 that enables various information displays and input operations related to automatic driving.

A tablet personal computer, a smartphone, or the like can be employed as the mobile communication terminal 5. For the wireless communication, a wireless LAN (local area network), such as Wi-Fi (registered trademark) or the like, or a short-range wireless communication, such as Bluetooth (registered trademark) or the like, can be employed.

As illustrated in FIG. 1, the tractor 1 includes left and right drivable and steerable front wheels 10 and left and right drivable rear wheels 11. As illustrated in FIGS. 1 and 2, the tractor 1 includes a cabin 13 constituting a boarding-type driving unit 12, an electronically controlled diesel engine with a common rail system (hereinafter referred to as the "engine") 14, a hood 15 covering the engine 14 and the like, and a transmission unit 16 that shifts power from the engine 14. As the engine 14, an electronically-controlled gasoline engine having an electronic governor or the like may be employed.

Figure 3:
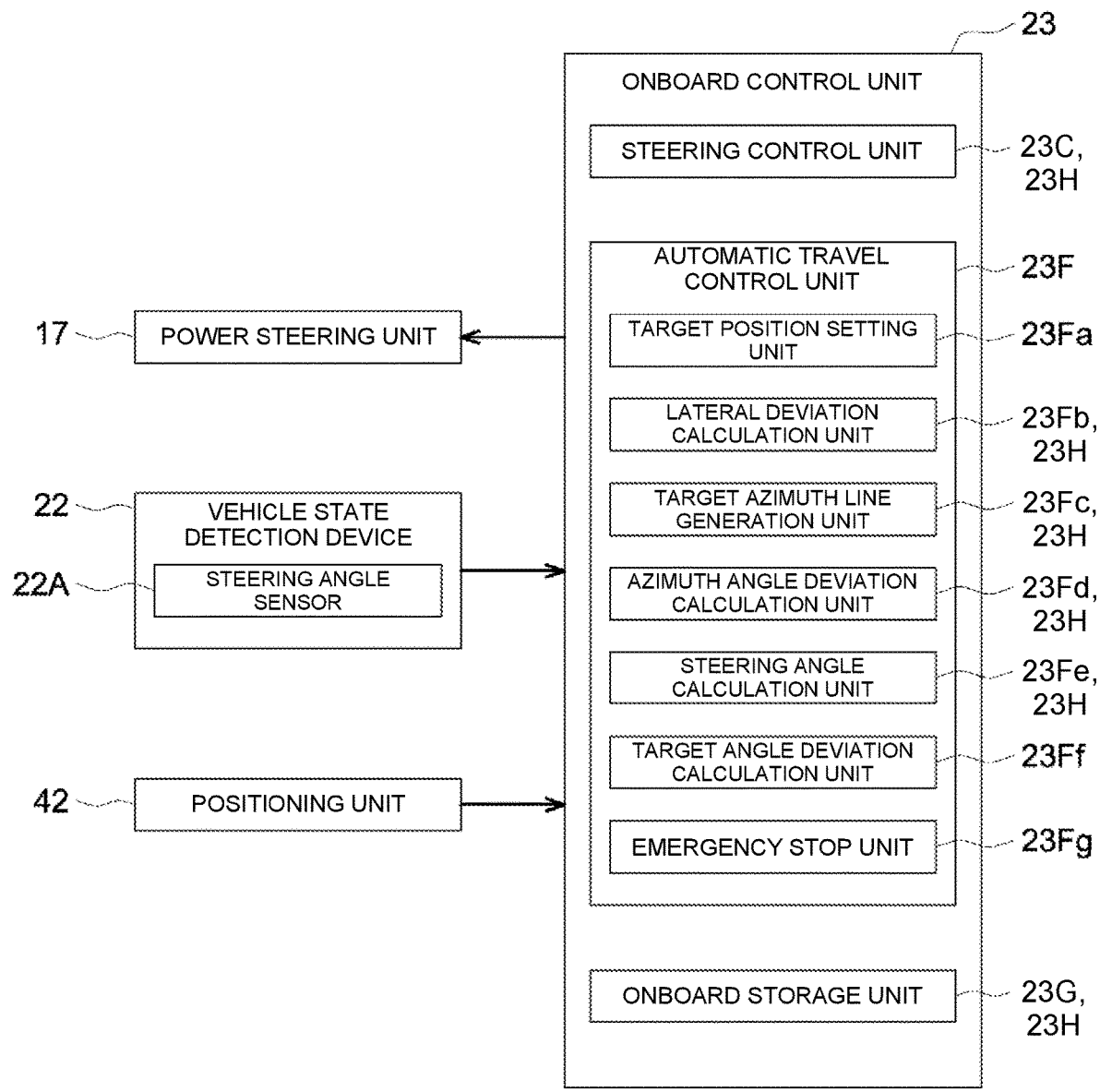
FIG. 3 is a block diagram illustrating a schematic configuration of an automatic steering control unit.

As illustrated in FIGS. 2 and 3, the tractor 1 includes, for example, a full hydraulic power steering unit (an example of a steering unit) 17 that steers the left and right front wheels 10, a brake unit 18 that brakes the left and right rear wheels 11, an electro-hydraulically controlled work clutch unit 19 that connects and disconnects power transmission to the rotary tiller 3, an electro-hydraulically controlled lifting drive unit 20 that drives the rotary tiller 3 up and down, and an electro-hydraulically controlled rolling unit 21 that enables driving of the rotary tiller 3 in the roll direction, a vehicle state detection device 22 that includes various sensors and switches for detecting various setting conditions and operating states of various parts of the tractor 1, and an onboard control unit 23 having various controllers. An electric power steering unit including an electric motor for steering may be employed as the power steering unit 17.

As illustrated in FIG. 1, the driving unit 12 includes a steering wheel 25 for manual steering, a seat 26 for a passenger, and an operation terminal 27 that enables display of various types of information, input operations, or the like. Although not illustrated, the driving unit 12 includes, for example, operation levers such as an accelerator lever, a gear shift lever, and the like, and operation pedals such as an accelerator pedal, a clutch pedal, and the like. A multi-touch liquid crystal monitor, a virtual terminal compatible with ISOBUS, or the like can be employed as the operation terminal 27.

Although not illustrated in the drawing, the transmission unit 16 includes a travel transmission system that shifts power from the engine 14 for traveling and a work transmission system that shifts the power for working. Thus, the power shifted by the travel transmission system is transmitted to the left and right front wheels 10 via the power transmission axle for driving the front wheels, a differential device for the front wheels which is built in a front axle case, and the like. The power shifted by the work transmission system is transmitted to the rotary tiller 3. The transmission unit 16 includes left and right brakes that separately brake the left and right rear wheels 11.

The travel transmission system includes, for example, an electronically-controlled main transmission device that shifts the power from the engine 14, an electro-hydraulically controlled forward and rearward travel switching device that switches the power from the main transmission device for forward travel and rearward travel, a gear sub-transmission device that shifts the forward travel power and the rearward travel power from the forward and rearward travel switching device between high and low two levels, a gear creeping transmission device that shifts the forward travel power and the rearward travel power from the forward and rearward travel switching device to a very low speed level, a rear wheel differential device that distributes the power from the sub-transmission device or the creeping transmission device to the left and right rear wheels 11, left and right deceleration devices that decelerate the power from the rear wheel differential device and transmit the decelerated power to the left and right rear wheel 11, and an electro-hydraulically controlled transmission switching device that switches the transmission from the sub-transmission device or the creeping transmission device to the left and right front wheels 10.

The work transmission system includes, for example, a hydraulic work clutch that connects and disconnects the power from the engine 14, the work transmission device that switches the power transmitted via the work clutch among three forward rotations and one reverse rotation, and a PTO shaft that outputs the power from the work transmission device for working. The power taken from the PTO shaft is transmitted to the rotary tiller 3 via an external transmission shaft (not illustrated) or the like. The work clutch is included in the work clutch unit 19 along with an electromagnetic control valve (not illustrated) that controls the oil flow to the working clutch.

The main transmission device employs an integrated hydro-static mechanical transmission (I-HMT), which is an example of the hydro static transmission (HST) having a higher transmission efficiency than that of the HST.

Instead of the I-HMT, other continuously variable transmission devices such as a hydraulic mechanical transmission (HMT) device which is an example of a hydraulic mechanical continuously variable transmission, a hydro-static continuously variable transmission device, or a belt-type continuously variable transmission device may be employed. Furthermore, instead of the continuously variable transmission, it is also possible to employ an electro-hydraulically-controlled multistage transmission having multiple hydraulic transmission clutches and multiple electromagnetic-type transmission valves that control oil flows corresponding to the multiple hydraulic transmission clutches.

The transmission switching device switches the transmission state to the left and right front wheels 10 between a transmission cut-off state in which the power transmission to the left and right front wheels 10 is cut off, an even speed transmission state in which the power is transmitted to the left and right front wheels 10 so that the peripheral speed of the left and right front wheels 10 becomes equal to the peripheral speed of the left and right rear wheels 11, and a double speed transmission state in which the power is transmitted to the left and right front wheels 10 so that the peripheral speed of the left and right front wheels 10 becomes approximately twice as high as the peripheral speed of the left and right rear wheels 11. This allows the drive state of the tractor 1 to be switched between two-wheel drive, four-wheel drive, and front-wheel double speed states.

Although not illustrated, the brake unit 18 includes, for example, the left and right brakes described above, a foot brake system that operates the left and right brakes in conjunction with stepping operations on the left and right brake pedals provided in the driving unit 12, a parking brake system that operates the left and right brakes in conjunction with operations of the parking lever provided in the driving unit 12, and a swing brake system that operates the brake on the inside of a turn in conjunction with steering of the left and right front wheels 10 exceeding a set angle.

The vehicle state detection device 22 is a general term for various types of sensors and switches provided in the components of the tractor 1. As illustrated in FIG. 3, the vehicle state detection device 22 includes a steering angle sensor 22A that detects the steering angle of the front wheels 10. Although not illustrated, the vehicle state detection device 22 includes, for example, an acceleration sensor that detects the operating position of an acceleration lever, a transmission sensor that detects an operating position of the transmission lever, a reverser sensor that detects an operating position of a reverser lever for forward and rearward switching, a first rotation sensor that detects the output number of rotations of the engine 14, a vehicle speed sensor that detects the vehicle speed of the tractor 1, a height sensor that detects the height position of the rotary tiller 3, and a second rotation sensor that detects the number of rotations of the PTO shaft as the number of driving rotations the rotary tiller 3.

As illustrated in FIG. 2, the onboard control unit 23 includes, for example, an engine control unit 23A that performs control related to the engine 14, a transmission unit control unit 23B that performs control related to the transmission unit 16, such as switching of the vehicle speed, switching between the forward travel and the rearward travel, or the like of the tractor 1, a steering control unit 23C that performs control related to steering, a work device control unit 23D that performs control related to the work device such as the rotary tiller 3 or the like, a display control unit 23E that performs control related to display and notification to the operation terminal 27 or the like, and a nonvolatile onboard storage unit 23G that stores a target path P (see FIG. 5) for automatic travel. The control units 23A to 23F are each composed of an electronic control unit integrating a microcontroller and the like, various types of control programs, or the like. The control units 23A to 23F are connected in a mutually communicable manner via a controller area network (CAN).

For mutual communications among the control units 23A to 23F, communication standards other than the CAN or next generation communication standards, such as, for example, an onboard Ethernet, a CAN with flexible data rate (CAN-FD), or the like may also be employed.

The engine control unit 23A executes, for example, an engine speed maintenance control to maintain the engine speed corresponding to the operating position of the accelerator lever in accordance with the detection information from the accelerator sensor and the first rotation sensor.

In accordance with the detection information from the transmission sensor, the vehicle speed sensor, and the like, the transmission unit control unit 23B executes, for example, a vehicle speed control to control the operation of the main transmission device so that the vehicle speed of the tractor 1 can be changed to the speed corresponding to the operating position of the transmission lever, and the forward and rearward travel switching control to switch the transmission state of the forward and rearward travel switching device in accordance with the detection information of the reverser sensor. The vehicle speed control includes deceleration stop processing to decelerate the main transmission device until it reaches a zero-speed state and stop traveling of the tractor 1 when the transmission lever is operated to the zero-speed position.

Although not illustrated, the transmission unit control unit 23B switches the travel drive mode of the tractor 1, in accordance with the operation of a first selection switch that enables selection of the travel drive mode of the tractor 1 among a two-wheel drive mode, a four-wheel drive mode, a front wheel speed increase mode, a swing brake mode, and a front wheel speed increase and swing brake mode. The first selection switch is provided on the driving unit 12 and is included in the vehicle state detection device 22.

In the two-wheel drive mode, the transmission unit control unit 23B switches the transmission switching device to the transmission cut-off state to allow the tractor 1 to travel in the two-wheel drive mode by cutting the transmission to the left and right front wheels 10 and only driving the left and right rear wheels 11.

In the four-wheel drive state, the transmission unit control unit 23B switches the transmission switching device to the even speed drive state to allow the tractor 1 to travel in the four-wheel drive state by activating the transmission to the left and right front wheels 10 and driving the left and right front and rear wheels 10, 11 at an even speed.

In the front wheel speed increase mode, the transmission unit control unit 23B executes a front-wheel speed change control to switch the transmission switching device between the even speed transmission state and the double-speed transmission state in accordance with the detection information from the steering angle sensor 22A. The front-wheel speed change control includes the front-wheel speed increase processing for switching the transmission switching device from the even speed transmission state to the double-speed transmission state when it is determined that the tractor 1 has started turning when the steering angle of the front wheels 10 reaches an angle exceeding a set angle, and the front wheel speed decrease processing for switching the transmission switching device from the double-speed transmission state to the even speed transmission state when it is determined that the tractor 1 has finished turning when the steering angle of the front wheels 10 reaches an angle smaller than the set angle. This allows the tractor 1 to travel in the front-wheel speed increase mode when the tractor 1 is turning in the front wheel speed increase mode, thus reducing the turning radius of the tractor 1.

In the swing brake mode, the transmission unit control unit 23B executes the swing brake control to control the operation of the brake unit 18 and switch the left and right brakes between a break release state and an inside-of-turn breaking state in accordance with the detection information from the steering angle sensor 22A. The swing brake control includes inside-of-turn braking processing to determine that the tractor 1 has started turning when the steering angle of the front wheel 10 reaches an angle exceeding a set angle, and determine the steering direction of the front wheels 10 according to an increase and decrease of the steering angle to switch the inside-of-turn braking from the brake release state to the braking state, and also includes break release processing to determine that the tractor 1 has finished turning when the steering angle of the front wheels 10 has reached an angle smaller than the set angle to switch the (inside of a turn) braking state to the brake release state. This allows the tractor 1 to travel in the inside-of-turn braking state during turning of the tractor 1 in the swing brake mode, thus decreasing the turning radius of the tractor 1.

In the front-wheel speed increase swing brake mode, the transmission unit control unit 23B executes the front wheel speed change control, as described above, and the swing brake control in accordance with the detection information from the steering angle sensor 22A. This allows the tractor 1 to travel in a front-wheel speed increase and inside-of-turn braking state during turning of the tractor 1 in the front-wheel speed increase swing brake mode, thus further reducing the turning radius of the tractor 1.

Although not illustrated, the work device control unit 23D executes control operations, such as a work clutch control to control the operation of the work clutch unit 19 in accordance with, for example, the operation of the PTO switch provided in the driving unit 12, a lifting control to control the operation of the lifting drive unit 20 in accordance with the operation of the lifting switch provided in the driving unit 12, a setting value of a height setting dial, and the like, and a rolling control to control the operation of the rolling unit 21 in accordance with a setting value of the roll angle setting dial provided in the driving unit 12 or the like. The PTO switch, the lifting switch, the height setting dial, and the roll angle setting dial are included in the vehicle state detection device 22.

As illustrated in FIGS. 2 and 3, the tractor 1 includes a positioning unit 42 that measures the current position, the current azimuth, and the like. As illustrated in FIG. 2, the positioning unit 42 includes, for example, a satellite navigation device 43 that uses a global navigation satellite system (GNSS), which is an example of a satellite positioning system, to measure the current position and the current azimuth of the tractor 1, and an inertial measurement unit (IMU) 44 that includes a three-axis gyroscope and a three-way acceleration sensor to measure the posture and the azimuth of the tractor 1. Examples of the positioning method using the GNSS include differential GNSS (DGNSS), real time kinematic GNSS (RTK-GNSS), and the like. The present embodiment employs the RTK-GNSS which is suitable for positioning a moving body. Therefore, as illustrated in FIG. 1, a base station 6 that enables positioning by the RTK-GNSS is installed at a known location in the periphery of the field.

As illustrated in FIGS. 1 and 2, the tractor 1 and the base station 6 each includes a GNSS antenna 45, 60 that receives radio waves sent from the positioning satellites 7 (see FIG. 1), and a communication module 46, 61 that enables wireless communication of information including positioning information between the tractor 1 and the base station 6. This allows the satellite navigation device 43 of the positioning unit 42 to measure the current position and the current azimuth of the tractor 1 with high accuracy, in accordance with the positioning information obtained by the GNSS antenna 45 of the tractor 1 by receiving the radio waves from the positioning satellite 7, and the positioning information obtained by the GNSS antenna 60 of the base station 6 by receiving the radio waves from the positioning satellite 7. The positioning unit 42 can also measure the current position, the current azimuth, and the attitude angle (yaw angle, roll angle, pitch angle) of the tractor 1 by the satellite navigation device 43 and the inertial measurement device 44.

In this tractor 1, the inertial measurement device 44 of the positioning unit 42, the GNSS antenna 45, and the communication module 46 are included in the antenna unit 47 illustrated in FIG. 1. The antenna unit 47 is disposed at the center in the left-right direction at the upper front side of the cabin 13.

Figure 5:
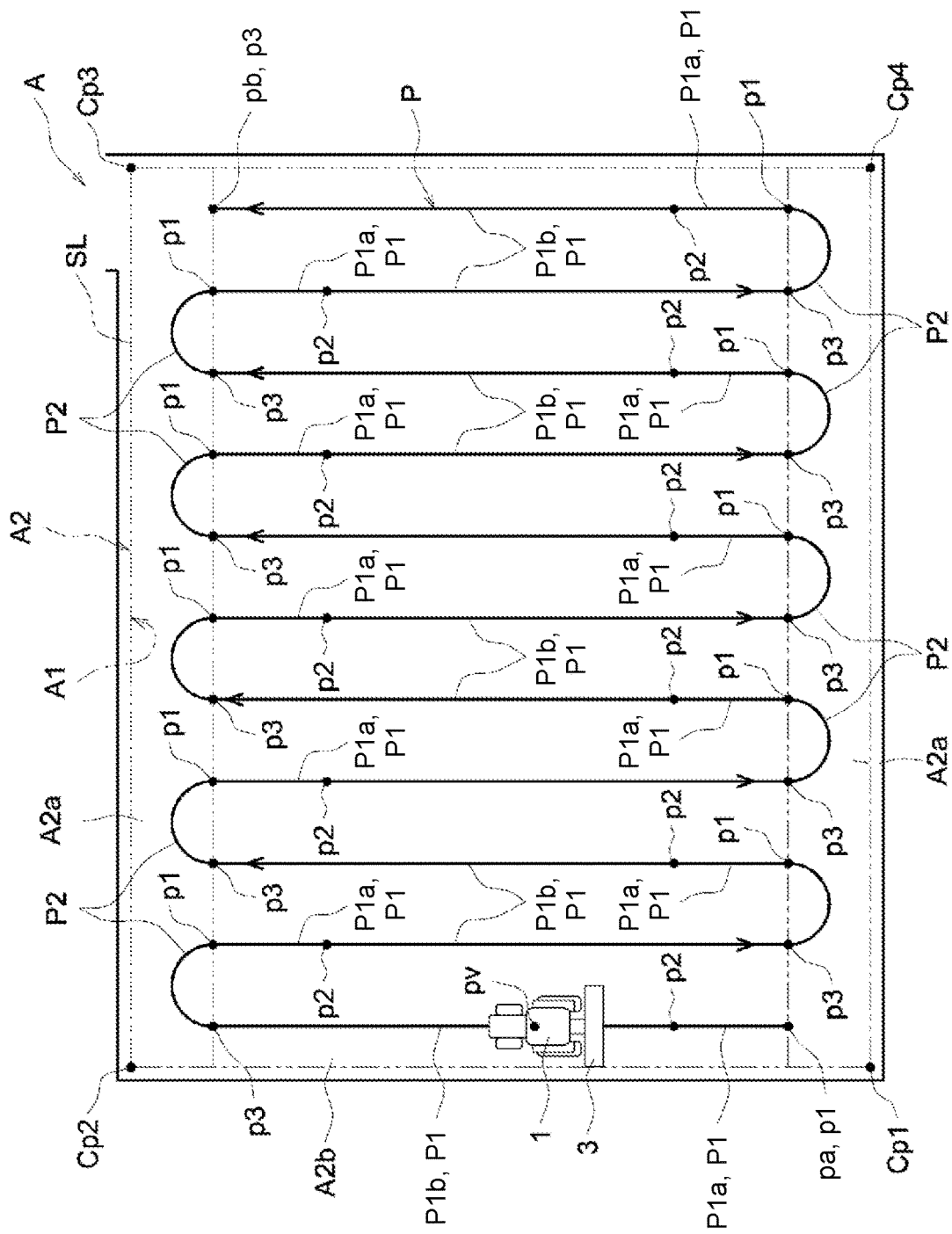
FIG. 5 is a plan view illustrating an example of a target path for automatic travel.
Figure 6:
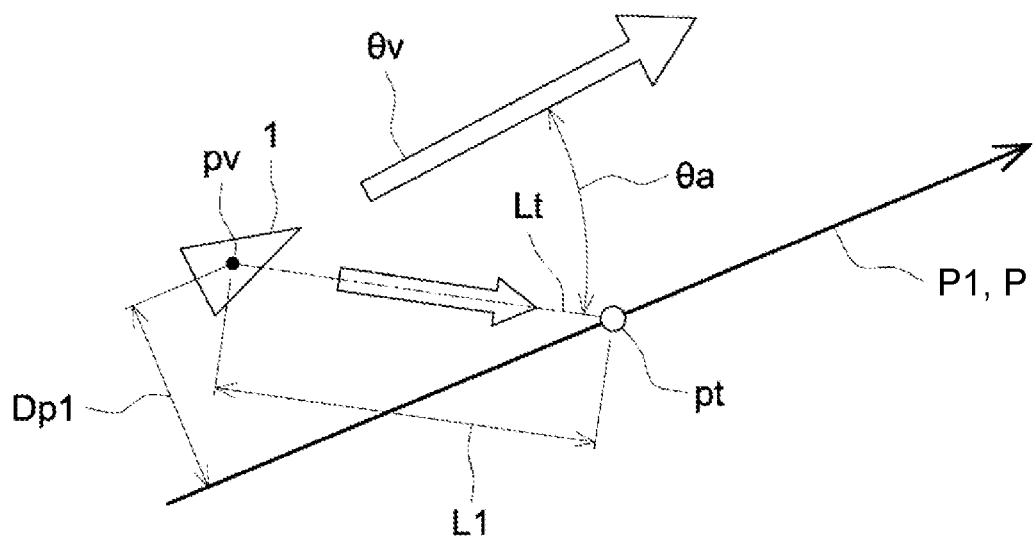
FIG. 6 is a view explaining the calculation of azimuth deviation when the work vehicle automatically travels on a straight path.
Figure 7:
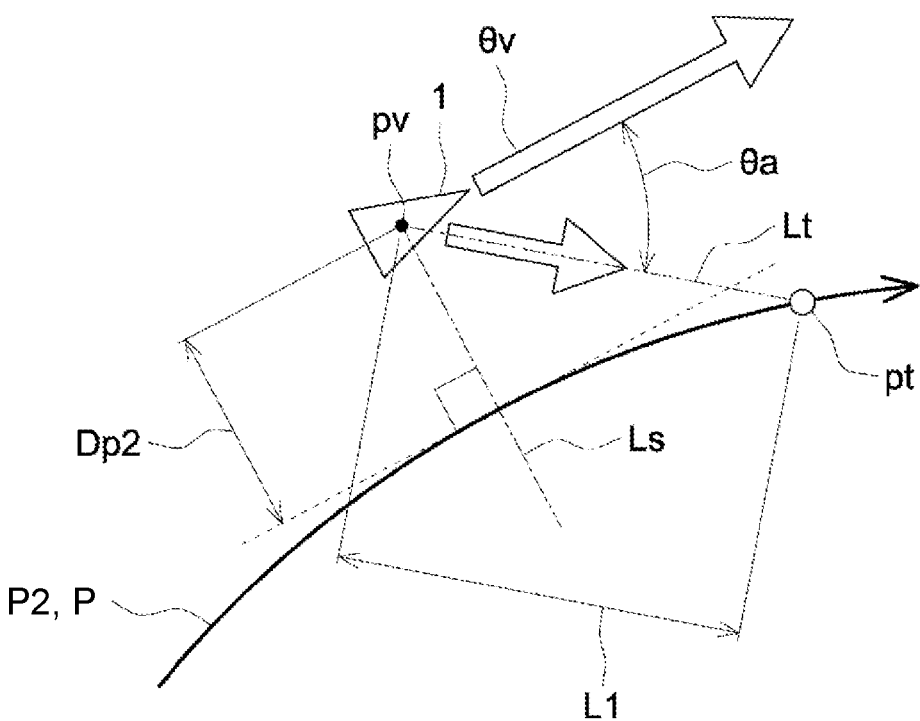
FIG. 7 is a view explaining illustrates the calculation of azimuth deviation when the work vehicle is automatically traveling along a turning path.

As illustrated in FIGS. 5 to 7, a current position pv (reference position for positioning) of the tractor 1 measured by the positioning unit 42 is set at the position of the GNSS antenna 45 on the tractor 1. The GNSS antenna 45 is installed on the center in the left-right direction of the tractor 1 at the upper front side of the cabin 13.

The current position pv of the tractor 1 measured by the positioning unit 42 may be set at the center of the rear axle of the tractor 1 instead of the position where the GNSS antenna 45 is mounted. In that case, the current position pv of the tractor 1 can be determined from the positioning information of the positioning unit 42 and the vehicle body information including the positional relationship between the mounting position of the GNSS antenna 45 and the center position of the rear axle of the tractor 1.

As illustrated in FIG. 2, the mobile communication terminal 5 includes an electronic control unit with a microcontroller and other components integrated therein, a terminal control unit 51 including various kinds of control programs, and the like. The terminal control unit 51 includes, for example, a display control unit 51A that controls display and notification to the display devices 50, a target path generation unit 51B that generates a target path P on which the tractor 1 can travel automatically, and a nonvolatile terminal storage unit 51C that stores the target path P generated by the target path generation unit 51B. The terminal storage unit 51C stores various types of information used for generating the target path P, such as vehicle body information including a turning radius of the tractor 1 and the work width of the rotary tiller 3, and field information obtained from the positioning information. The field information includes, for example, four corner points Cp1 to Cp4 (see FIG. 5) which are shape identifying points (shape identifying coordinates) in the field A obtained by GNSS while the tractor 1 travels along the outer periphery of the field A in identifying the shape and size of the field A, and a rectangular shape identifying line SL (see FIG. 5) connecting those corner points Cp1 to Cp4 to identify the shape and size of the field A, and the shape and size of the identified field A.

As illustrated in FIG. 2, the tractor 1 and the mobile communication terminal 5 each include the communication module 48, 52, enabling wireless communication of the information including the positioning information between the onboard control unit 23 and the terminal control unit 51. The communication module 48 of the tractor 1 functions as a converter that converts communication information bidirectionally for the CAN and Wi-Fi, when Wi-Fi is employed in the wireless communication with the mobile communication terminal 5. The terminal control unit 51 can acquire various types of information with respect to the tractor 1 such as the current position and current azimuth of the tractor 1 through wireless communication with the onboard control unit 23. Thus, it is possible to display various types of information including the current position and current azimuth of the tractor 1 relative to the target path P on the display device 50 of the mobile communication terminal 5.

The target path generation unit 51B generates the target path P in accordance with, for example, the turning radius of the tractor 1 and the work width of the rotary tiller 3, which are included in the vehicle body information, and the shape and size of the field A included in the field information.

For example, in a case of a rectangular field A, as illustrated in FIG. 5, in which a start position pa and an end position pb of the automatic travel are set, and a work travel direction of the tractor 1 is set to a direction along the short side of the field A, then the target path generation unit 51B first divides the field A into a margin area A1 adjacent to the outer periphery of the field A and a workable area A2 located inside the margin area A1, in accordance with the four corner points Cp1 to Cp4 and the rectangular shape identifying line SL.

Next, in accordance with the turning radius of the tractor 1 and the work width of the rotary tiller 3, for example, the target path generation unit 51B divides the workable area A2 into a pair of turnaround areas A2a each set at the end of the long side of the workable area A2, and a reciprocating travel area A2b set between the pair of the turnaround areas A2a. After that, the target path generation unit 51B generates, in the reciprocating travel area A2b, a plurality of straight paths P1 arranged in parallel at predetermined intervals corresponding to the work width in a direction along the long sides of the field A. In addition, the target path generation unit 51B generates a plurality of change of direction paths P2 in each change of direction area A2a, connecting the plurality of straight paths P1 in the traveling order of the tractor 1.

Then, the target path generation unit 51B sets a work travel start position p2 at a certain distance from the start position p1 of each straight path P1, at which the rotary tiller 3 is switched from the non-working state to the working state upon arrival of the tractor 1 and to start the work travel of the tractor 1. In addition, a position p3, which is an end position of each straight path P1 (a start position of the change of direction path P2) is set as a work travel end position of the tractor 1, at which the rotary tiller 3 is switched from the working state to the non-working state upon arrival of the tractor 1 to end the work travel of the tractor 1.

This allows the target path generation unit 51B to generate the target path P along which the tractor 1 can travel automatically from the start position pa to the end position pb of the automatic travel set in the field A illustrated in FIG. 5.

In the field A illustrated in FIG. 5, the margin area A1 is the area secured between the outer periphery of the field A and the workable area A2 to prevent the rotary tiller 3 or the like from coming into contact with other objects, such as ridges or fences adjacent to the field A, during the automatic travel of the tractor 1 at the edge of the workable area A2. In the target path P, a first path portion P1*a*, which extends between the start position p1 of each straight path P1 and the work travel start position p2, and the change of direction path P2 are non-working paths on which the tractor 1 travels automatically with the rotary tiller 3 switched to the non-working state. A second path portion P1*b* which extends between the work travel start position p2 and the work travel end position p3 of each straight path P1 is a work path on which the tractor 1 travels automatically with the rotary tiller 3 switched to the working state.

In each change of direction path P2, it is possible to employ a U-shaped turning path for changing the direction of the tractor 1 in a U-shape manner, or a switchback turning path for changing the direction of the tractor 1 in a fishtail manner using switchback, according to the relationship between the turning radius of the tractor 1 and the work width of the rotary tiller 3. In the present embodiment, as illustrated in FIGS. 5 and 8 to 15, the U-shaped turning path is employed as the change of direction path P2. Therefore, the change of direction path P2 functions as the turning path.

The target path P illustrated in FIG. 5 is merely an example, and the target path generation unit 51B can generate various target paths P that suit the information including the vehicle body information that differs depending on the model of the tractor 1, the type of the work device, or the like, and the field information such as the shape and the size of the field A that differs for each field A, or the like.

The target path P is stored in the terminal storage unit 51C in association with the vehicle body information, the field information, or the like, and can be displayed on the display device 50 of the mobile communication terminal 5. The target path P includes the aforementioned start and end positions pa, pb, of the automatic travel, the work travel start position p2, and the work travel end position p3, as well as various information related to the automatic travel, such as the traveling direction and target vehicle speed of the tractor 1 set for each straight path P1 and each change of direction path P2.

The terminal control unit 51 transmits the field information, the target path P, and the like that are stored in the terminal storage unit 51C to the onboard control unit 23 in response to a transmission request command from the onboard control unit 23. The onboard control unit 23 stores the received field information, the target path P, and the like in the onboard storage unit 23G. In transmitting the target path P, the terminal control unit 51 may transmit, for example, all target paths P from the terminal storage unit 51C to the onboard control unit 23 at once before the tractor 1 starts automatic travel. Furthermore, the terminal control unit 51 may divide the target path P into a plurality of divided paths information by a predetermined distance, and sequentially transmit the information of a predetermined number of divided paths in accordance with the travel order of the tractor 1 from the terminal storage unit 51C to the onboard control unit 23 each time the travel distance of the tractor 1 reaches the predetermined distance from the stage before the tractor 1 starts the automatic travel.

The automatic travel control unit 23F receives inputs of detection information from various sensors and switches included in the vehicle state detection device 22. This allows the automatic travel control unit 23F to monitor various setting states, various operation states of individual components, and the like of the tractor 1.

In a state in which a user, such a passenger or an administrator, performs various types of manual setting operations to enable automatic travel of the tractor 1 and switches the travel mode of the tractor 1 from the manual travel mode to the automatic travel mode, when the display device 50 of the mobile communication terminal 5 is operated to command the start of the automatic travel, then the automatic travel control unit 23F starts the automatic travel control to allow the tractor 1 to automatically travel along the target path P while the positioning unit 42 acquiring, for example, the current position and current azimuth of the tractor 1.

For example, the automatic travel control unit 23F terminates the automatic travel control and switches the travel mode from the automatic travel mode to the manual travel mode during execution of the automatic travel control, in a case where the user operates the display device 50 of the mobile communication terminal 5 to give an instruction for terminating the automatic travel, or the user aboard the driving unit 12 operates a manual operation tool, such as the steering wheel 25, an acceleration pedal, or the like.

The automatic travel control by the automatic travel control unit 23F includes, for example, automatic engine control processing in which a control command for automatic travel related to the engine 14 is transmitted to the engine control unit 23A, automatic vehicle speed control processing in which a control command for automatic travel related to the vehicle speed and forward and rearward travel switching of the tractor 1 is transmitted to the transmission unit control unit 23B, automatic steering control processing in which a control command for automatic travel related to steering is transmitted to the steering control unit 23C, and automatic work control processing in which a control command for automatic travel related to the work device, such as the rotary tiller 3 or the like, is transmitted to the work device control unit 23D.

In the automatic engine control processing, the automatic travel control unit 23F transmits, for example, an engine speed change command for instructing a change of the engine speed in accordance with a set engine speed or the like included in the target path P to the engine control unit 23A. The engine control unit 23A executes engine speed change control for automatically changing the engine speed in response to various types of control commands related to the engine 14 transmitted from the automatic travel control unit 23F.

In the vehicle speed automatic control processing, the automatic travel control unit 23F transmits, to the transmission unit control unit 23B, a command such as a transmission operation command for instructing a transmission operation of the main transmission device in accordance with a target vehicle speed included in the target path P, and a forward and rearward travel switching command for instructing a forward and rearward travel switching operation of the forward and rearward travel switching device in accordance with the traveling direction or the like of the tractor 1 included in the target path P. For example, the transmission unit control unit 23B executes, in response to the various kinds of control commands related to the main transmission device, the forward and rearward travel switching device, or the like, transmitted from the automatic travel control unit 23F, the automatic vehicle speed control for automatically controlling the operation of the main transmission device, and the automatic forward and rearward travel switching control for automatically controlling the operation of the forward and rearward travel switching device. The automatic vehicle speed control includes, for example, automatic deceleration stop processing for controlling the main transmission device to decelerate to the zero-speed state and stop traveling the tractor 1 in a case where the target vehicle speed included in the target path P is the zero speed.

In the automatic steering control processing, the automatic travel control unit 23F transmits, for example, a steering command to instruct steering of the left and right front wheels 10 to the steering control unit 23C. In response to the steering command transmitted form the automatic travel control unit 23F, the steering control unit 23C executes, for example, an automatic steering control to control the operation of the power steering unit 17 to steer the left and right front wheels 10, and an automatic swing brake control to operate the brake unit 18 to activate the inside-of-turn brake when the left and right front wheels 10 are steered by an angle exceeding the set angle.

In the automatic work control processing, the automatic travel control unit 23F transmits, to the work device control unit 23D, a command such as a work start command t to instruct the rotary tiller 3 to switch to the work state upon arrival of the tractor 1 at the work travel start position p2 included in each target path P, and a work end command to instruct the rotary tiller 3 to switch to the non-working state upon arrival of the tractor 1 at the work travel end position included in each target path P. In response to various control commands for the rotary tiller 3 transmitted from the automatic travel control unit 23F, the work device control unit 23D executes, for example, an automatic work start control to lower the rotary tiller 3 to a working height by controlling the operation of the work clutch unit 19 and the lifting drive unit 20, and an automatic work end control to lift the rotary tiller 3 to a non-working height and stop it. Thus, it is possible to switch the travel state of the tractor 1 that automatically travels along the target path P between the work travel state in which the tractor 1 automatically travels with the rotary tiller 3 being in the working state (the state in which the rotary tiller 3 is driven and lowered to the working height), and the non-working travel state in which the tractor 1 automatically travels with the rotary tiller 3 being in the non-working state (the state in which the rotary tiller 3 is lifted to the non-working height and the drive is stopped).

Thus, the above-described automatic travel unit 4 includes the power steering unit 17, the brake unit 18, the work clutch unit 19, the lifting drive unit 20, the rolling unit 21, the vehicle state detection device 22, the onboard control unit 23, the positioning unit 42, the communication modules 46, 48, and the like. With these components operating properly, it is possible to make the tractor 1 automatically travel with high accuracy along the target path P and to make the rotary tiller 3 perform the tillage work properly.

Figure 4:
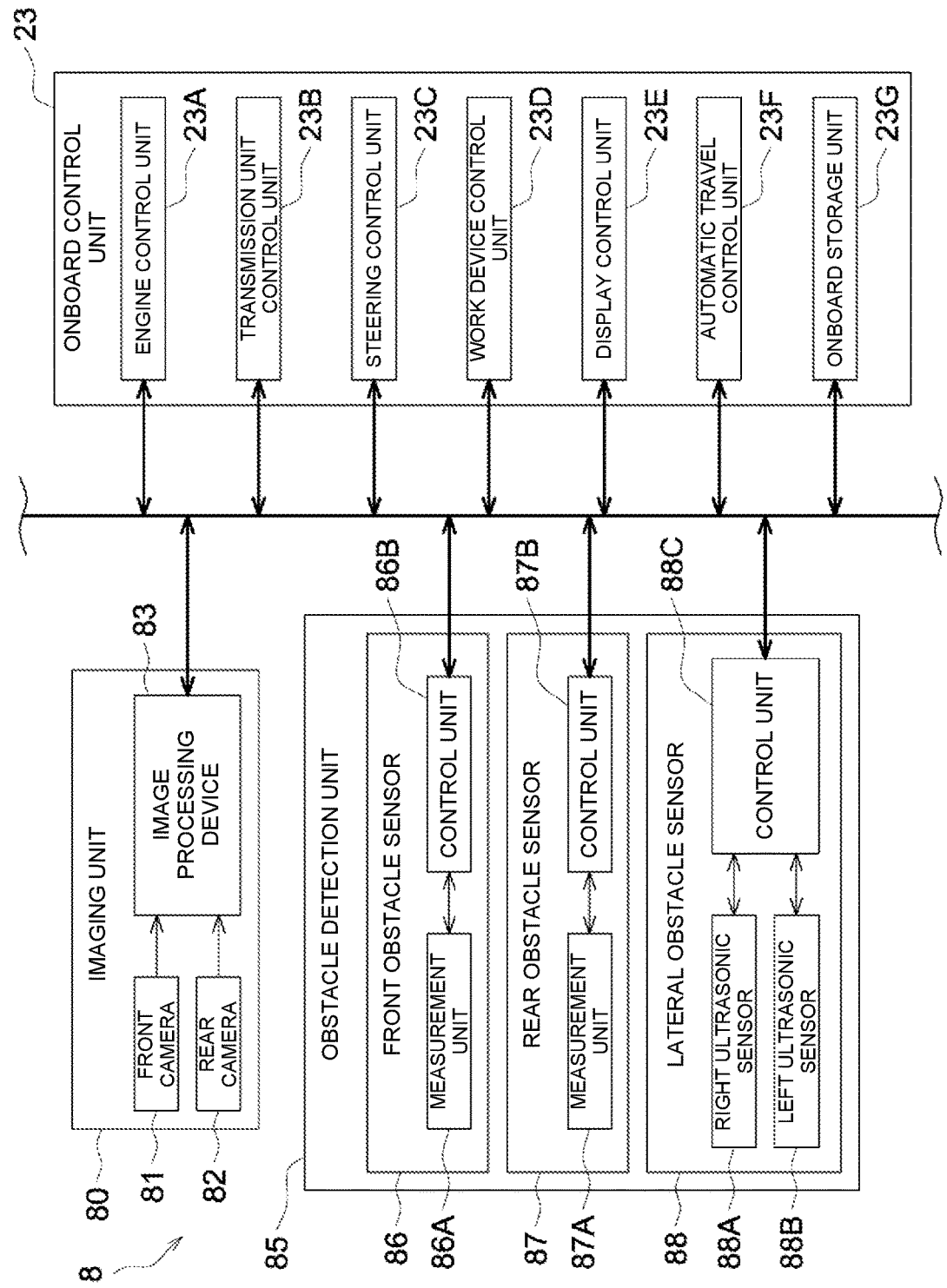
FIG. 4 is a block diagram illustrating a schematic configuration of an obstacle detection unit and other components.

As illustrated in FIGS. 2 and 4, the tractor 1 includes a surrounding situation acquisition system 8 that acquires the surrounding situation of the tractor 1. As illustrated in FIG. 4, the surrounding situation acquisition system 8 includes an imaging unit 80 that captures images around the tractor 1 to acquire image information, and an obstacle detection unit 85 that detects obstacles existing in the surroundings of the tractor 1. The obstacles detected by the obstacle detection unit 85 include persons, such as workers or the like who work in the field A, other work vehicles, utility poles, trees, or the like that exist in the field A.

As illustrated in FIGS. 1 and 4, the imaging unit 80 includes a front camera 81 having an imaging range set to a predetermined range in front of the cabin 13, a rear camera 82 having an imaging range set to a predetermined range behind the cabin 13, and an image processing device 83 (see FIG. 4) that processes image information from the front and rear cameras 81, 82. The image processing device 83 is composed of an electronic control unit that integrates microcontrollers and other components, as well as various control programs. The image processing device 83 is connected to the onboard control unit 23 or the like in a mutually communicable manner via the CAN.

The image processing device 83 performs processing such as image generation processing to generate a front side image and a rear side image of the tractor 1 corresponding to the imaging ranges of the cameras 81, 82 with respect to the image information transmitted sequentially from the front and rear cameras 81, 82. Then, the image transmission processing to transmit the generated images individually to the display control unit 23E of the onboard control unit 23 is performed. The display control unit 23E transmits each image from the image processing device 83 to the operation terminal 27 via the CAN and also to a display control unit 5A of the mobile communication terminal 5 via the communication modules 48, 52.

Thus, it is possible to display the front side image and the rear side image of the tractor 1 generated by the image processing device 83, for example, on the operation terminal 27 of the tractor 1, or the display device 50 of the mobile communication terminal 5. From such a display, the user can easily understand the situation in the front and rear sides of the tractor 1.

As illustrated in FIGS. 1 and 4, the obstacle detection unit 85 includes a front obstacle sensor 86 having an obstacle detection range set to the front side of the tractor 1, a rear obstacle sensor 87 having an obstacle detection range set to the rear side of the tractor 1, and a lateral obstacle sensor 88 having an obstacle detection range set to both left and right sides of the tractor 1. The front obstacle sensor 86 and the rear obstacle sensor 87 employs a lidar sensor that uses pulsed near-infrared laser light for the detection of obstacles. The lateral obstacle sensor 88 employs a sonar that uses ultrasonic waves for the detection of obstacles.

As illustrated in FIG. 4, the front obstacle sensor 86 and the rear obstacle sensor 87 each include a measurement unit 86A, 87A that measures a distance to each measuring point (measuring object) in the measurement range using a near-infrared laser beam, and a control unit 86B, 87B that generates, for example, distance images in accordance with the measurement information from the measurement unit 86A, 87A. The lateral obstacle sensor 88 includes a right ultrasonic sensor 88A and a left ultrasonic sensor 88B which transmit and receive ultrasonic waves, and a single control unit 88C that measures a distance to a measurement object existing in a measurement range, in accordance with the transmission and reception of ultrasonic waves by the ultrasonic sensors 88A, 88B.

The control units 86B, 87B, and 88C of the obstacle sensors 86 to 88 are each composed of an electronic control unit integrating a microcontroller and other components, various control programs, and the like. The control units 86B, 87B, and 88C are connected to the onboard control unit 23 or the like in a mutually communicable manner via the CAN.

The automatic travel control unit 23F executes collision avoidance control to control the travel of the tractor 1 to avoid collisions with obstacles in accordance with the positioning information of the positioning unit 42 and the detection information from each of the obstacle sensors 86 to 88 transmitted to the onboard control unit 23. In the collision avoidance control, the automatic travel control unit 23F controls the travel of the tractor 1 to avoid collision with obstacles by instructing the transmission unit control unit 23B to execute the travel control for each collision avoidance according to the detection information of each obstacle sensor 86 to 88.

The automatic steering control processing by the aforementioned automatic travel control unit 23F is described in detail. As illustrated in FIGS. 3, 6 and 7, the automatic travel control unit 23F includes a target position setting unit 23Fa that sets a target travel position pt at a predetermined position on, for example, the target path P at a predetermined distance L1 from the current position pv of the tractor 1 during automatic travel, a lateral deviation calculation unit 23Fb that calculates a deviation of the tractor 1 in the lateral direction orthogonal to the target path P (hereinafter referred to as the lateral deviation) Dp1 and Dp2 in accordance with the target path P and the current position pv of the tractor 1, a target azimuth line generation unit 23Fc that generates a target azimuth line Lt extending from the current position pv of tractor 1 to the target travel position pt, an azimuth angle deviation calculation unit 23Fd that calculates an azimuth angle deviation θa which is an angle formed between the current azimuth θv of the tractor 1 and the target azimuth line Lt (a difference between the current azimuth angle of the tractor 1 and the azimuth angle of the target azimuth line Lt), and a steering angle calculation unit 23Fe that calculates a target steering angle of the left and right front wheels 10 in accordance with the azimuth angle deviation θa.

Thus, in the automatic steering control processing, the automatic travel control unit 23F can calculate the azimuth angle deviation θa of the current azimuth θv of the tractor 1 relative to the target azimuth line Lt, and calculate the target steering angle of the left and right front wheels 10 according to the azimuth angle deviation θa. Subsequently, the automatic travel control unit 23F transmits the calculated target steering angle to the steering control unit 23C as a steering command. The steering control unit 23C steers the left and right front wheels 10 by controlling the operation of the power steering unit 17 in accordance with the target steering angle and the detected information from the steering angle sensor 22A which are transmitted from the automatic travel control unit 23F.

As a result, the tractor 1 can follow the target travel position pt set at a predetermined position on, for example, the target path P at a predetermined distance L1 from the current position pv of the tractor 1 in the traveling direction, thus allowing the tractor 1 to automatically travel along the target path P.

Specifically, in the tractor 1, the steering control unit 23C, the automatic travel control unit 23F including the lateral deviation calculation unit 23Fb, the target azimuth line generation unit 23Fc, the azimuth angle deviation calculation unit 23Fd, and the steering angle calculation unit 23Fe, and the onboard storage unit 23G function as the automatic steering control unit 23I1 that controls the operation of the power steering unit 17, in accordance with the positioning information from the positioning unit 42 and the target travel position pt so that the tractor 1 can follow the target travel position pt separated by the predetermined distance L1.

The control operations of the target position setting unit 23Fa and the automatic steering control unit 23I1 are described in detail below with reference to the explanatory diagrams illustrated in FIGS. 8 to 16.

Figure 8:
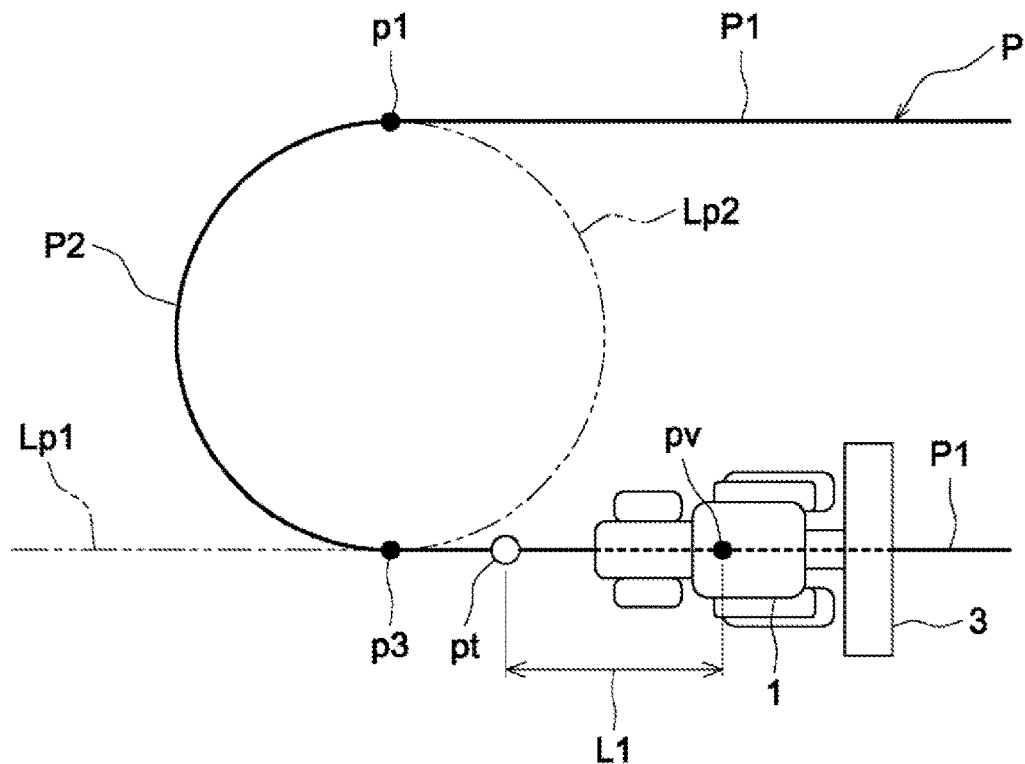
FIG. 8 is a view explaining a state in which the work vehicle and the target travel position are located on a straight path.
Figure 9:
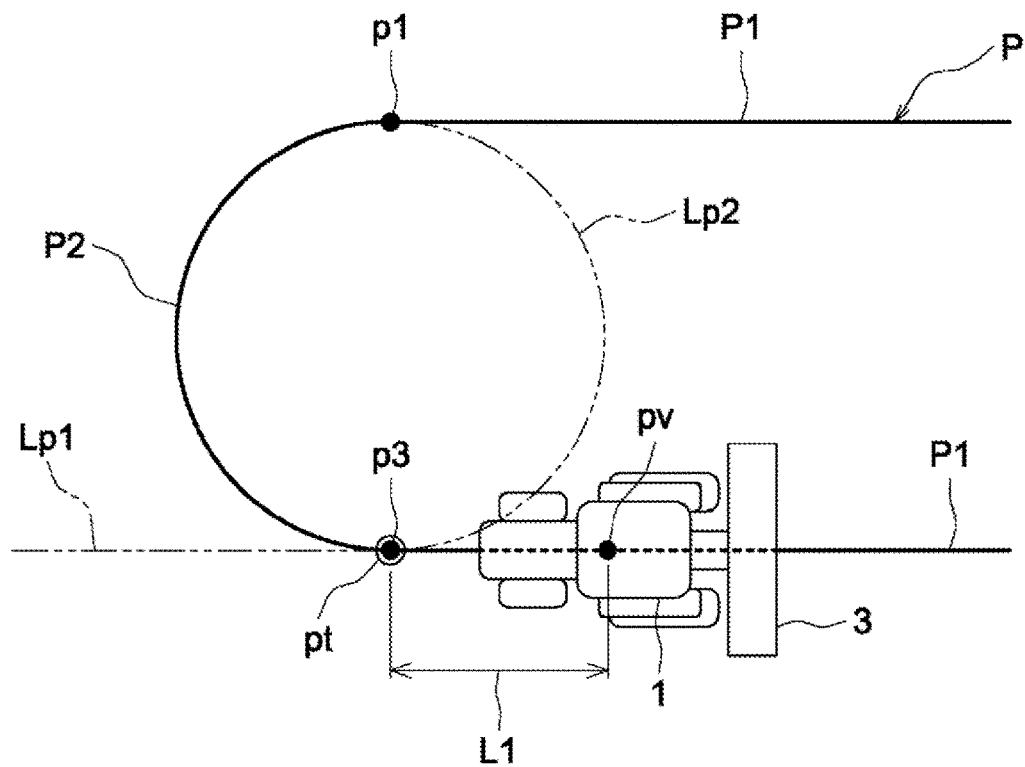
FIG. 9 is a view explaining a state in which the work vehicle is located on the straight path and the target travel position has reached an end position of the straight path (a start position of a turning path).
Figure 10:
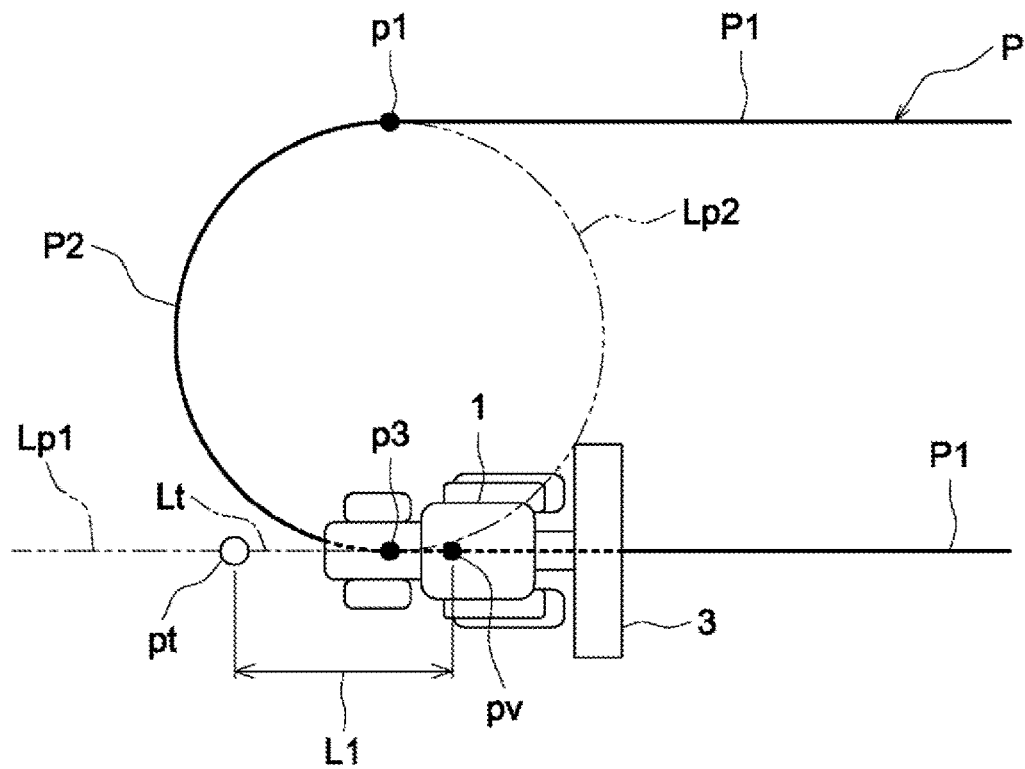
FIG. 10 is a view explaining a state in which the work vehicle is located on the straight path and the target travel position is on the extension of the straight path.

When the tractor 1 stands at the start position pa for automatic travel and the automatic travel control starts, the target position setting unit 23Fa sets the target travel position pt at a position on the straight path P1 at a predetermined distance L1 from the current position pv of the tractor 1, as illustrated in FIG. 8. Accordingly, the automatic steering control unit 23I1 controls the operation of the power steering unit 17 to allow the tractor 1 to follow the target travel position pt set on the straight path P1.

While the target travel position pt is set at a position on the straight path P1, the target position setting unit 23Fa determines whether the target position pt has reached the end position of the straight path P1 (the start position of the change of direction path P2) p3. When it is determined that the target travel position pt has reached the end position p3 of the straight path P1, the target position setting unit 23Fa changes the target travel position pt to a position on an extension line Lp1 of the straight path P1 illustrated in FIG. 10 from the position on the straight path P1 illustrated in FIGS. 8 and 9. Then, the automatic steering control unit 23I1 controls the operation of the power steering unit 17 so that the tractor 1 follows the target travel position pt set on the extension line Lp1 of the straight path P1.

Thus, it is possible to make the tractor 1 travel automatically and accurately along the straight path P1 until the tractor 1 reaches the end position p3 of the straight path P1, when compared to a case where the setting of the target travel position pt is changed from the position on the straight path P1 to the position on the change of direction path P2 when the target travel position pt reaches the end position p3 of the straight path P1.

If the target travel position pt is changed from the position on the straight path P1 to the position on the change of direction path P2 when the target travel position pt reaches the end position p3 of the straight path P1, the tractor 1 starts to change its direction by following the target travel position pt set at the position on the change of direction path P2 from a point where the tractor 1 is located in the middle of the straight path P1 at the predetermined distance L1 away from the end position p3 of the straight path P1. As a result, the tractor 1 cannot travel automatically and accurately along the straight path P1 at the end of the straight path P1.

While the target travel position pt is set on a position on the extension line Lp1 of the straight path P1, the target position setting unit 23Fa determines whether the tractor 1 has reached the end position p3 of the straight path P1. Then, when it is determined that the tractor 1 has reached the end position p3 of the straight path P1, the target position setting unit 23Fa changes the position of the target travel position pt to the position on the change of direction path P2 illustrated in FIGS. 11 and 12 from the position on the extension line Lp1 of the straight path P1 illustrated in FIG. 10. Accordingly, the automatic steering control unit 23I1 controls the operation of the power steering unit 17 so that the tractor 1 can follow the target travel position pt set on the change of direction path P2.

This allows the tractor 1 to automatically travel along the change of direction path P2 upon reaching the end position of the straight path P1 (the start position of the change of direction path P2) p3.

Figure 11:
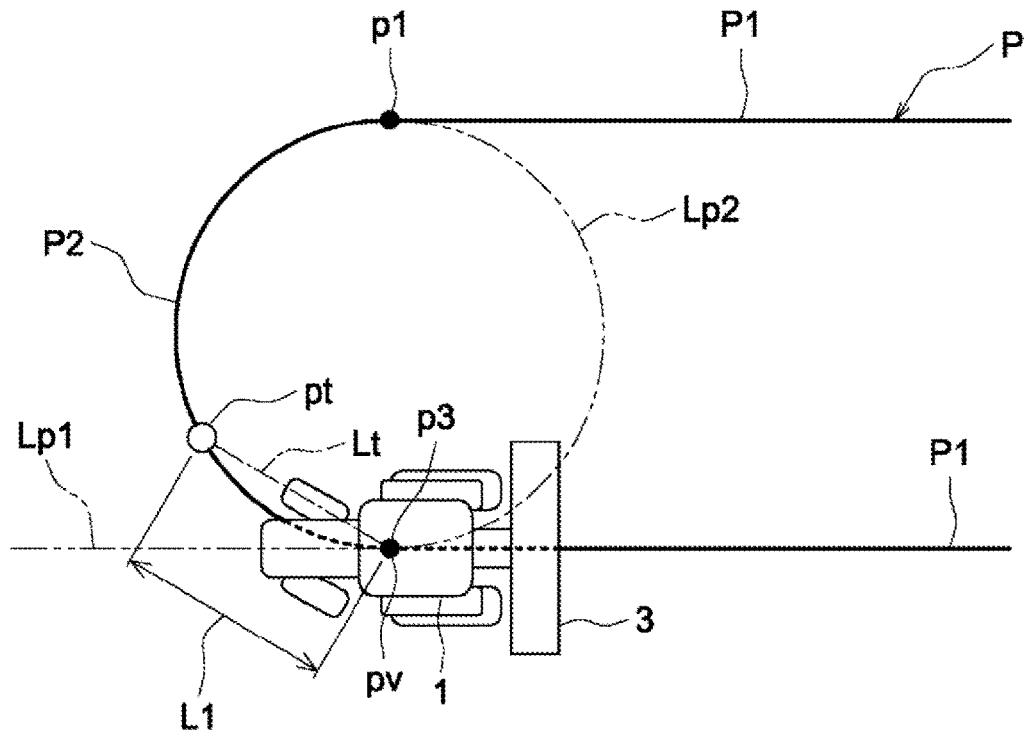
FIG. 11 is a view explaining a state in which the work vehicle has reached the end position of the straight path (the start position of the turning path) and the setting of the target travel position is changed to a position on the turning path.
Figure 12:
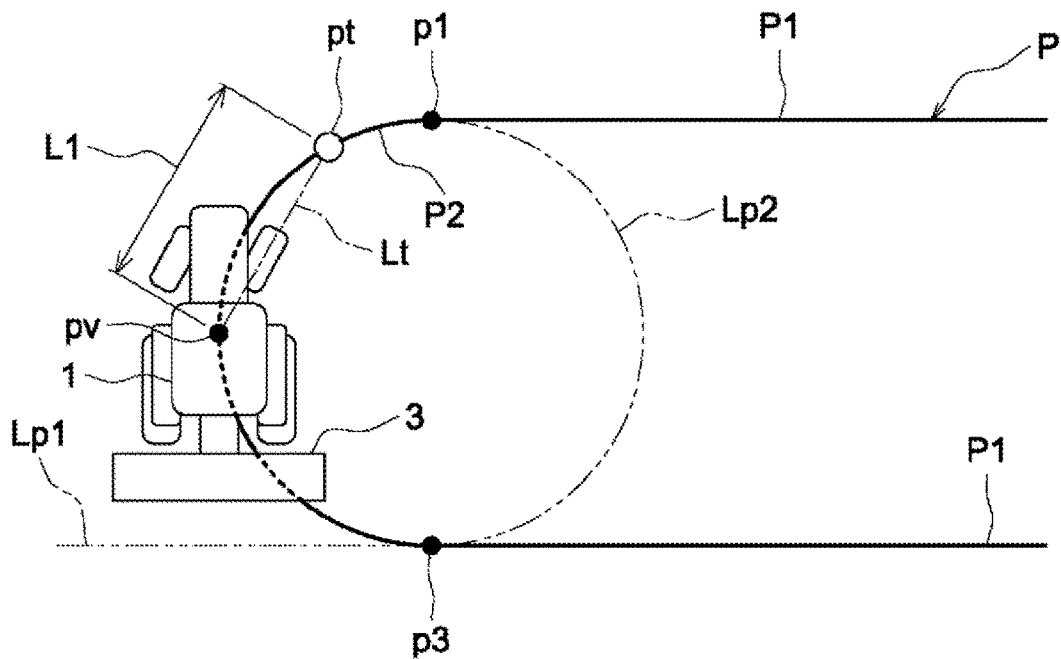
FIG. 12 is a view explaining a state in which the work vehicle and the target travel position are located on the turning path.
Figure 13:
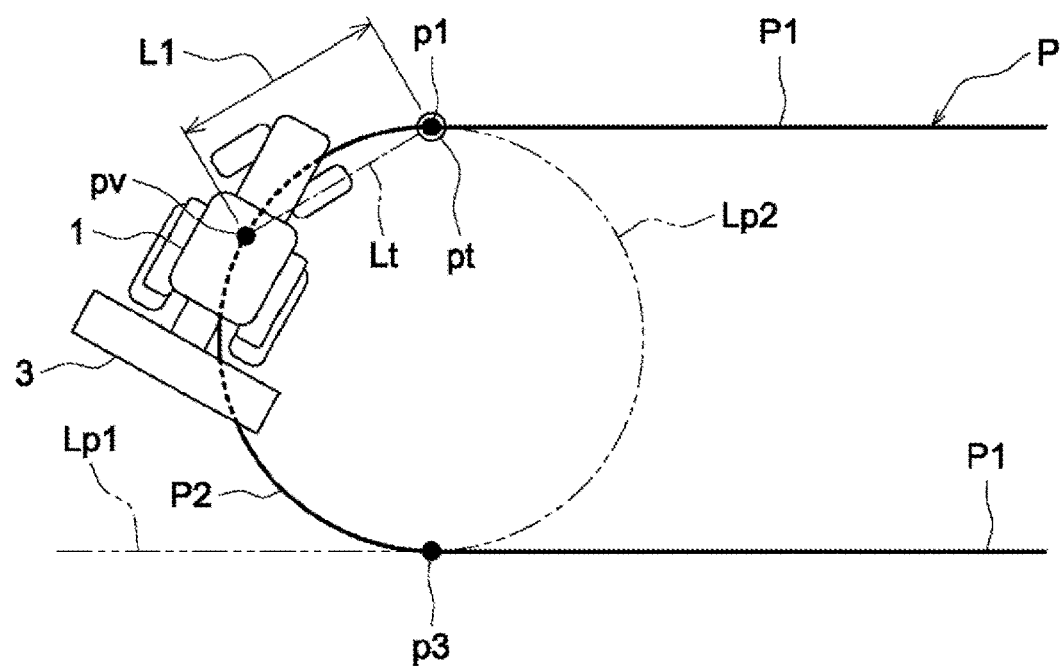
FIG. 13 is a view explaining a state in which the work vehicle is located on the turning path and the target travel position has reached the end position of the turning path (the start position of the straight path).
Figure 14:
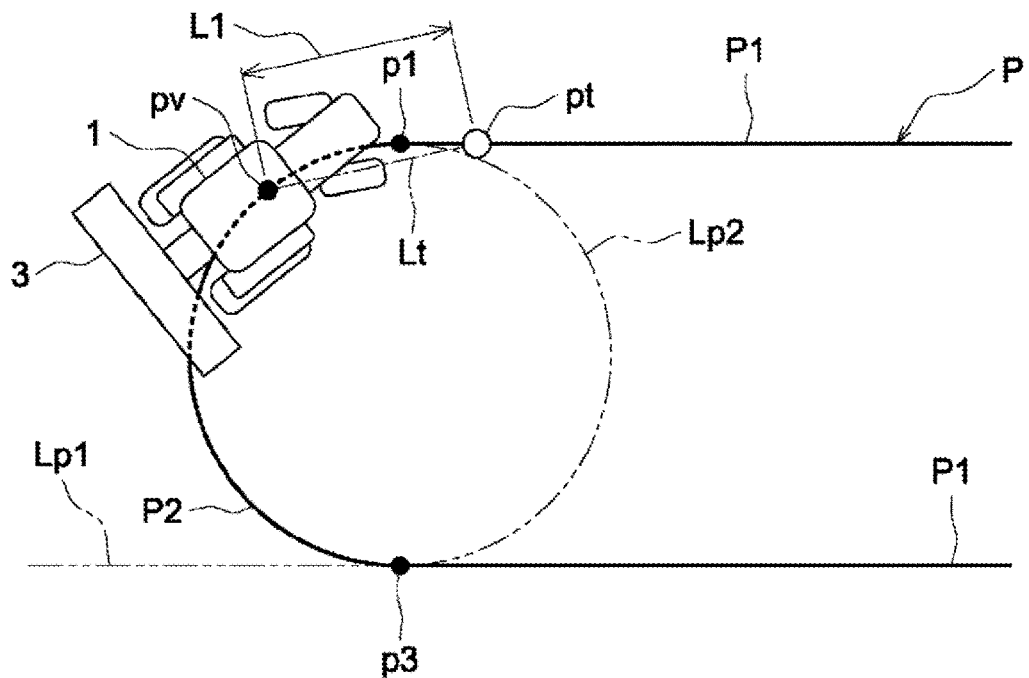
FIG. 14 is a view explaining a state in which the work vehicle is located on the turning path and the target travel position is on the straight path.
Figure 15:
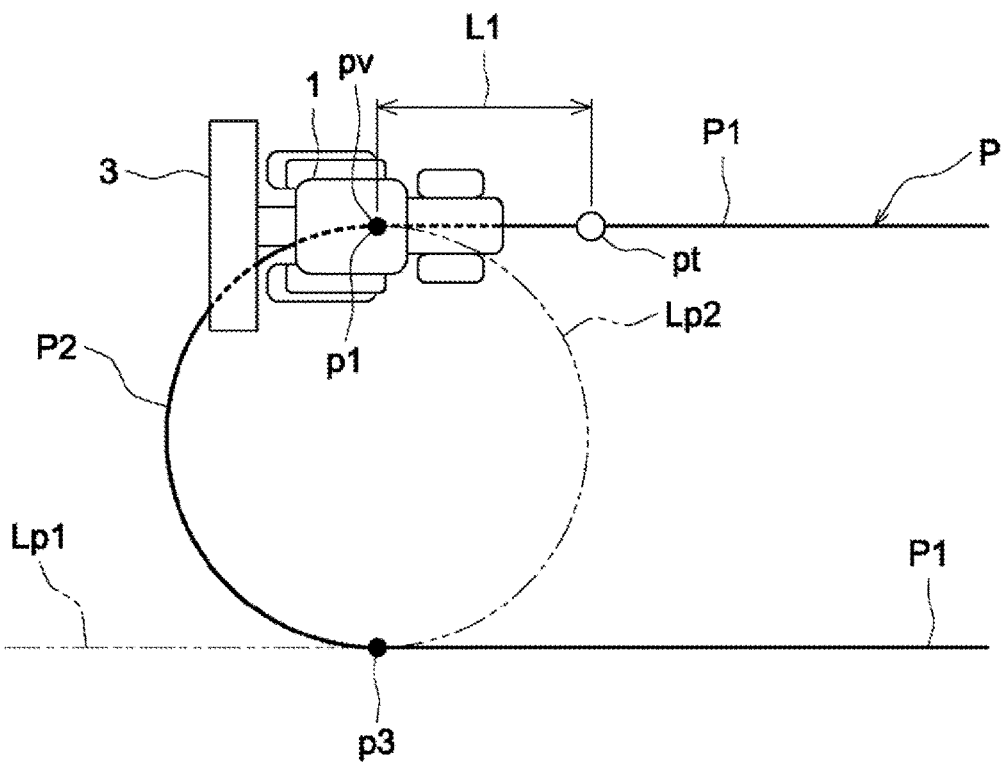
FIG. 15 is a view explaining a state in which the work vehicle has reached the end position of the turning path (the start position of the straight path) and the target travel position is located on the straight path.

While the target travel position pt is set on the position on the change of direction path P2, the target position setting unit 23Fa determines whether the target travel position pt has reached the end position of the change of direction path P2 (the start position of the straight path P1) p1. When it is determined that the target travel position pt has reached the end position p1 of the change of direction path P2, the target position setting unit 23Fa changes the setting of the position of the target travel position pt to a position on the straight path P1 illustrated in FIGS. 13 to 15 from the position on the change of direction path P2, as illustrated in FIGS. 11 to 13.

Accordingly, the automatic steering control unit 2311 controls the operation of the power steering unit 17 to allow the tractor 1 to follow the target travel position pt set on the straight path P1.

Thus, it is possible to make the tractor 1 start to follow the target travel position pt set at the position on the straight path P1 from a point where the tractor 1 is located on the change of direction path P2 at the predetermined distance L1 toward the near side from the end position of the change of direction path P2 (the start position of the straight path P1) p1.

This facilitates adjustment of the azimuth of the tractor 1 to the azimuth of the straight path P1 once the tractor 1 reaches the start position p1 of the straight path P1 and, as a result, the tractor 1 can start to travel automatically and accurately along the straight path P1 from a point where the tractor 1 has reached the start position p1 of the straight path P1.

If the setting of the target travel position pt is changed from the position on the change of direction path P2 to the position on the extension line Lp2 of the change of direction path P2 upon reaching the target travel position pt at the end position p1 of the change of direction path P2, and if the setting of the target travel position pt is changed from the position on the extension line Lp2 on the change of direction path P2 to the position on the straight path P1 upon arrival of the tractor 1 at the end position p1 of the change of direction path P2, then the tractor 1 follows the target travel position pt set on the position on the extension line Lp2 of the change of direction path P2 until the tractor 1 reaches the end position p1 of the change of direction path P2 after the target travel position pt has reached the end position p1 of the change of direction path P2. Therefore, when the tractor 1 reaches the end position p1 of the change of direction path P2, the left and right front wheels 10 are in a largely steered state toward the inside of the turn. In this state, if the tractor 1 is made to follow the target travel position pt that is changed to a position on the straight path P1, the tractor 1 returns to the straight path P1 after traveling the turn with a bias to the inside of a turn relative to the azimuth of the straight path P1. As a result, the tractor 1 cannot travel automatically and accurately along the straight path P1 for a while after the tractor 1 reaches the start position p1 of the straight path P1.

As illustrated in FIGS. 6, 7, and 16 to 18, when the target travel position pt is set on the straight path P1 of the target path P or on the extension line Lp1 of the straight path P1, the lateral deviation calculation unit 23Fb calculates the lateral deviation Dp1 of the tractor 1 relative to the straight path P1, using the straight path P1 as the deviation determination target path for the tractor 1 (see FIGS. 6 and 16 to 18). When the target travel position pt is set on the change of direction path P2 of the target path P, the lateral deviation calculation unit 23Fb calculates the lateral deviation Dp2 of the tractor 1 relative to the change of direction path P2, using the change of direction path P2 as the deviation determination target path (see FIGS. 7 and 16 to 18).

The lateral deviation Dp2 of the tractor 1 relative to the change of direction path P2 is a deviation of the tractor 1 relative to the change of direction path P2 on the straight line Ls extending through the center of the turn of the change of direction path P2 and the current position pv of the tractor 1 (see FIGS. 7 and 16 to 18), and is obtained as a difference between the distance from the center of the turn of the change of direction path P2 to the current position pv of the tractor 1 and the turning radius of the change of direction path P2.

As illustrated in FIGS. 3 and 19 to 21, the automatic travel control unit 23F includes a target angle deviation calculation unit 23Ff that calculates, in accordance with the target path P and the current position pv and current azimuth θv of the tractor 1, the angle formed between the azimuth of the target path P and the current azimuth θv of the tractor 1 at the current position pv of the tractor 1 (a difference between the azimuth angle of the target path P and the current azimuth angle of the tractor 1) as the target angle deviation θp1, θp2 of the tractor 1 relative to the target path P. When the target travel position pt is set on the straight path P1 of the target path P, the target angle deviation calculation unit 23Ff calculates the angle formed between the azimuth of the straight path P1 and the current azimuth θv of the tractor 1 at the current position pv of the tractor 1 as the target angle deviation θp1 for the tractor 1 relative to the straight path P1, using the straight path P1 as the deviation determination target path of the tractor 1. When the target travel position pt is set on the change of direction path P2 of the target path P, the target angle deviation calculation unit 23Ff calculates the angle formed between the azimuth of the change of direction path P2 and the current azimuth θv of the tractor 1 at the current position pv of the tractor 1 as the target angle deviation θp2 for the tractor 1 relative to the change of direction path P2, using the change of direction path P2 as the deviation determination target path for the tractor 1.

In calculating the target angle deviation θp2 relative to the change of direction path P2, the azimuth of the change of direction path P2 is in a direction orthogonal to the line Ls (see FIGS. 19 and 20) extending through the center of the turn of the change of direction path P2 and the current position pv of the tractor 1.

As illustrated in FIG. 3, the automatic travel control unit 23F includes an emergency stop unit 23Fg that stops the tractor 1 immediately in a case where the tractor 1 deviates from the target path P. When the target travel position pt is set on the straight path P1 of the target path P or on the extension line Lp1 of the straight path P1, the emergency stop unit 23Fg determines whether the lateral deviation Dp1 of the tractor 1 relative to the straight path P1 calculated by the lateral deviation calculation unit 23Fb exceeds an allowable deviation width Wp1 (see FIGS. 16 to 18) set for the straight path P1. When the lateral deviation Dp1 of the tractor 1 relative to the straight path P1 exceeds the allowable deviation width Wp1 (see FIG. 16), the emergency stop of the tractor 1 is instructed to the transmission unit control unit 23B or the like to bring the tractor 1 to an emergency stop.

When the target travel position pt is set on the change of direction path P2 of the target path P, the emergency stop unit 23Fg determines whether the lateral deviation Dp2 of the tractor 1 relative to the change of direction path P2 calculated by the lateral deviation calculation unit 23Fb exceeds the allowable deviation width Wp2 (see FIGS. 16 to 18) set for the change of direction path P2. Then, when the lateral deviation Dp2 of the tractor 1 relative to the change of direction path P2 exceeds the allowable deviation width Wp2, the emergency stop of the tractor 1 is instructed to the transmission unit control unit 23B and the like to bring tractor 1 to an emergency stop.

When the target travel position pt is set on the straight path P1 of the target path P or on the extension line Lp1 of the straight path P1, the emergency stop unit 23Fg determines whether the target angle deviation θp1 of the tractor 1 relative to the straight path P1 calculated by the target angle deviation calculation unit 23Ff exceeds the allowed deviation angle θd1 (see FIGS. 19 to 21) set for the straight path P1. Then, when the target angle deviation θp1 of the tractor 1 relative to the straight path P1 exceeds the allowable deviation angle θd1 (see FIG. 19), an emergency stop of the tractor 1 is instructed to the transmission unit control unit 23B and the like to bring the tractor 1 to the emergency stop.

When the target travel position pt is set on the change of direction path P2 of the target path P, the emergency stop unit 23Fg determines whether the target angle deviation θp2 of the tractor 1 relative to the change of direction path P2 calculated by the target angle deviation calculation unit 23Ff exceeds the allowable deviation angle θd2 (see FIGS. 19 and 20) set for the change of direction path p2. Then, when the target angle deviation θp2 of the tractor 1 relative to the change of direction path P2 exceeds the allowable deviation angle θd2, the emergency stop of the tractor 1 is instructed to the transmission unit control unit 23B and the like to bring the tractor 1 to an emergency stop.

In other words, in this tractor 1, if the current position pv of the tractor 1 deviates from the allowable deviation width Wp1, Wp2 of the target path P, or if the current heading θv of the tractor 1 deviates from the allowable deviation angle θd1, θd2 relative to the target path P, the emergency stop unit 23Fg can quickly bring the tractor 1 to an emergency stop through control operation.

Figure 16:
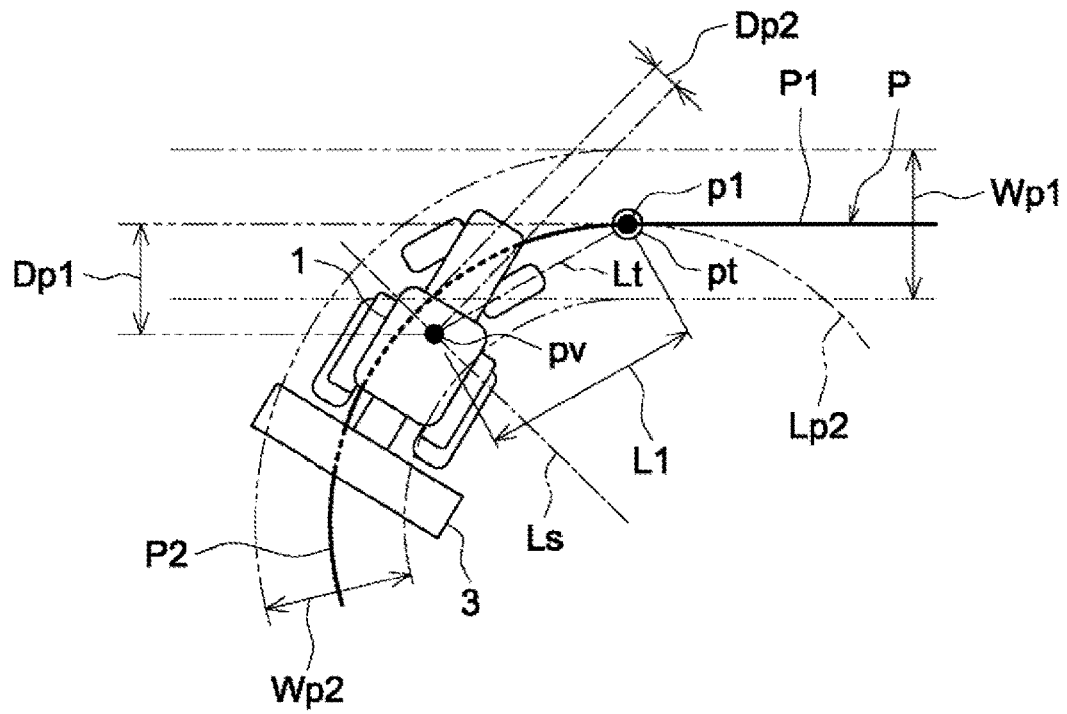
FIG. 16 is a view explaining a state in which a lateral deviation of the work vehicle relative to the straight path exceeds an allowable deviation width when the target travel position has reached the end position of the turning path (the start position of the straight path).
Figure 19:
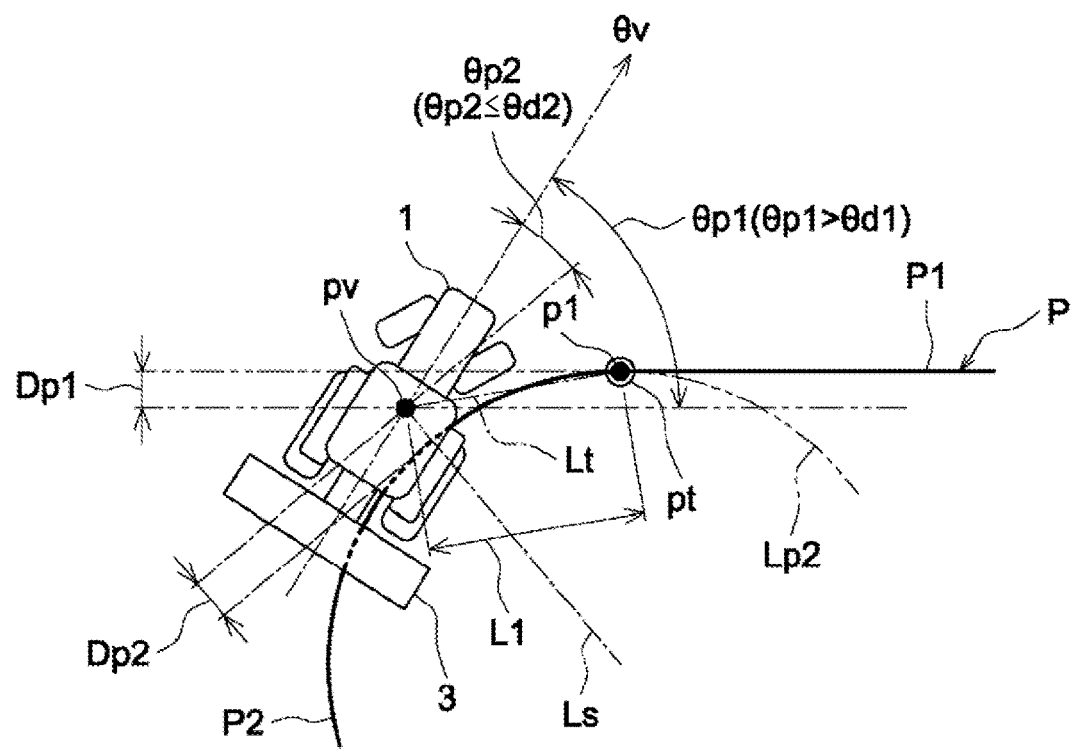
FIG. 19 is a view explaining a state in which the target angular deviation of the work vehicle relative to the straight path exceeds an allowable deviation angle when the target travel position reaches the end position of the turning path (the start position of the straight path).

The control operation of the above-mentioned target position setting unit 23Fa is described in detail. When the target travel position pt reaches the end position p1 of the change of direction path P2, the lateral deviation Dp1 of the tractor 1 relative to the straight path P1 has exceeded the allowable deviation width Wp1, as illustrated in FIG. 16, or the target angle deviation θp1 of the tractor 1 relative to the straight path P1 has exceeded the allowable deviation angle θd1, as illustrated in FIG. 19. In such a case, when it is determined that the target travel position pt has reached the end position p1 of the change of direction path P2, it would cause an inconvenience of unnecessary emergency stop of the tractor 1 by the control operation of the emergency stop unit 23Fg if the target position setting unit 23Fa simply changes the setting of the target travel position pt from the position on the change of direction path P2 to the position on the straight path P1.

Therefore, the target position setting unit 23Fa is configured to execute an emergency stop avoidance control to avoid the unnecessary emergency stop of the tractor 1 by the control operation of the emergency stop unit 23Fg when it is determined that the target travel position pt reaches the end position p1 of the change of direction path P2 in the control operation described above.

Figure 22:
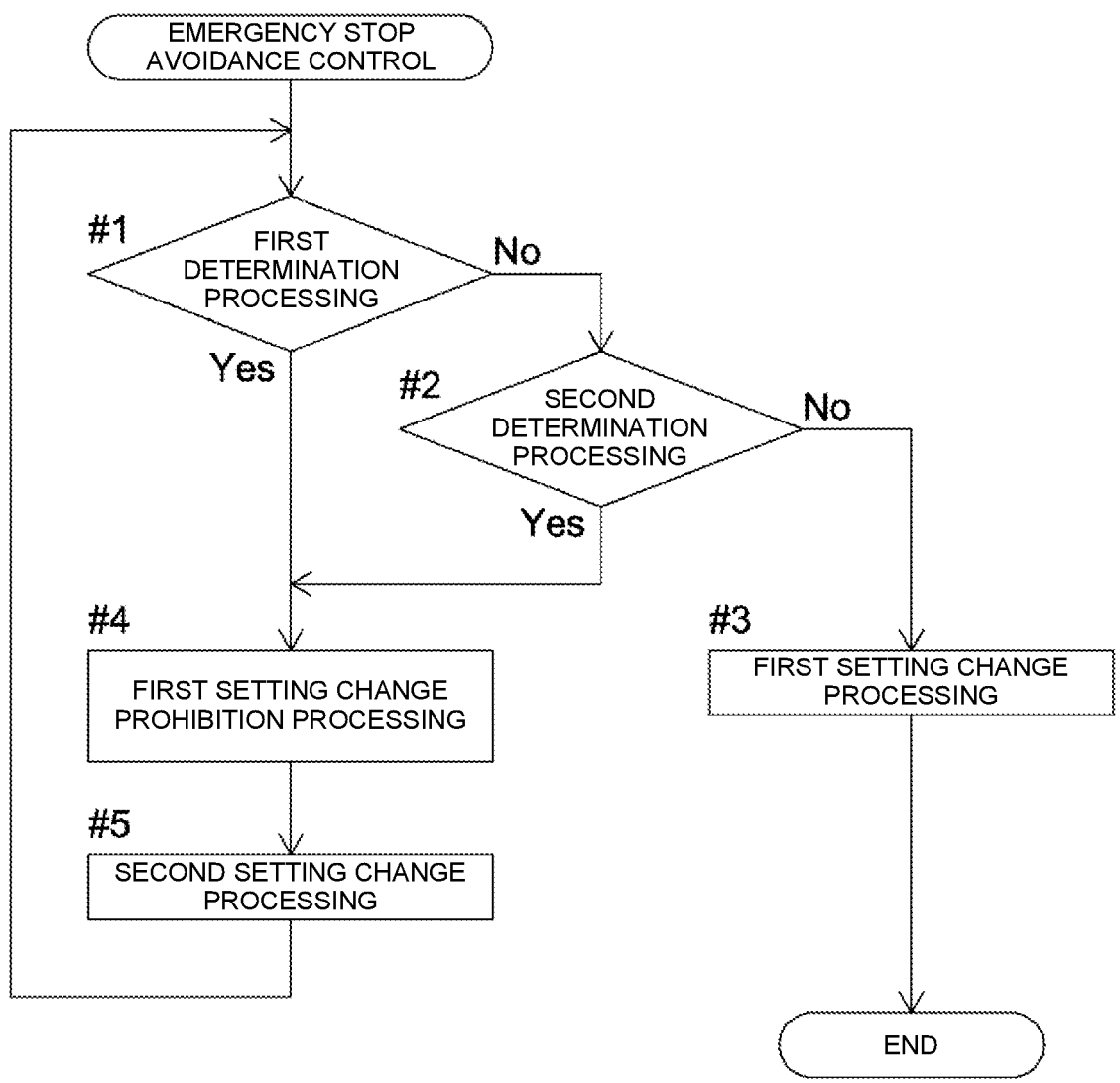
FIG. 22 is a flowchart illustrating the control operation of a target position setting unit in an emergency stop avoidance control.

In the following, the control operation of the target position setting unit 23Fa in the emergency stop avoidance control is described with reference to the explanatory views illustrated in FIGS. 16 to 21 and the flowchart illustrated in FIG. 22.

When it is determined that the target travel position pt has reached the end position of the change of direction path P2, the target position setting unit 23Fa executes first determination processing to determine whether the lateral deviation Dp1 of the tractor 1 relative to the straight path P1 exceeds the allowable deviation width Wp1 relative to the straight path P1 (step #1).

In the first determination processing, if the lateral deviation Dp1 of the tractor 1 relative to the straight path P1 does not exceed the allowable deviation width Wp1, the target position setting unit 23Fa executes second determination processing to determine whether the target angle deviation θp1 of the tractor 1 relative to the straight path P1 described above exceeds the allowable deviation angle θd1 relative to the straight path P1 (step #2).

In the second determination processing, if the target angle deviation θp1 of tractor 1 relative to the straight travel path P1 does not exceed the allowable deviation angle θd1, the target position setting unit 23Fa executes first setting change processing to change the target travel position pt to from the position on the change of direction path P2 to the position on the straight path P1 (step #3), and then ends the emergency stop avoidance control.

Thus, the traveling state of the tractor 1 can be switched from a turning travel state for turning along the change of direction path P2 to a straight travel state for traveling straight along the straight path P1.

Figure 17:
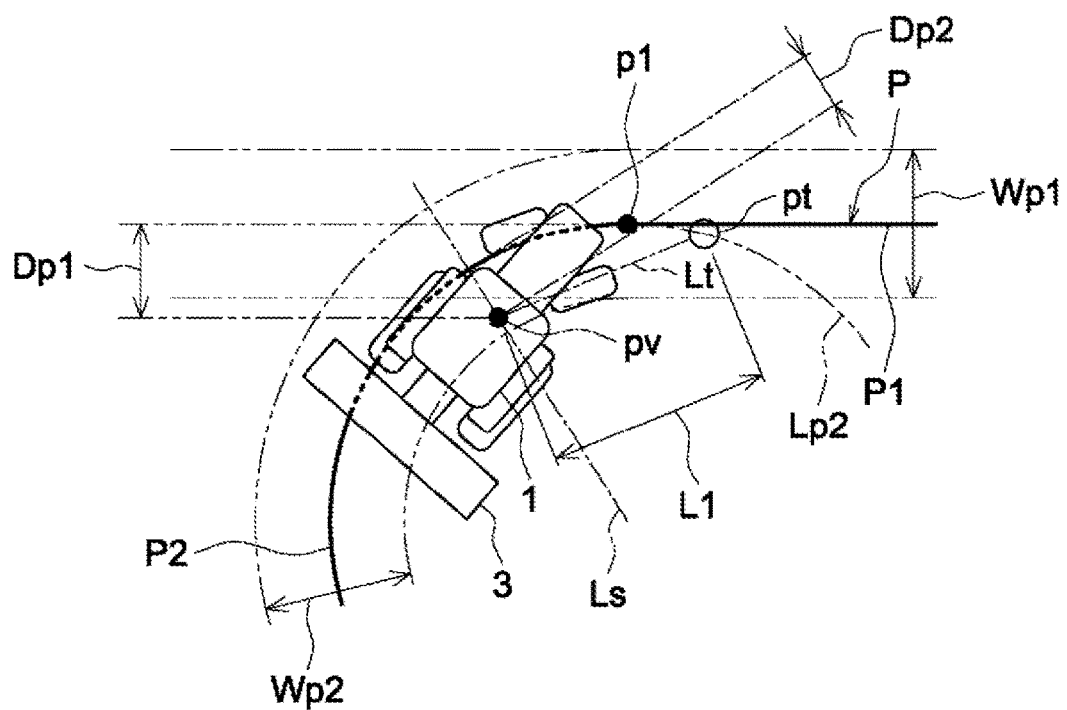
FIG. 17 is a view explaining a state in which the lateral deviation of the work vehicle relative to the straight path exceeds the allowable deviation width and the target travel position is set at a position on the extension of the turning path.
Figure 18:
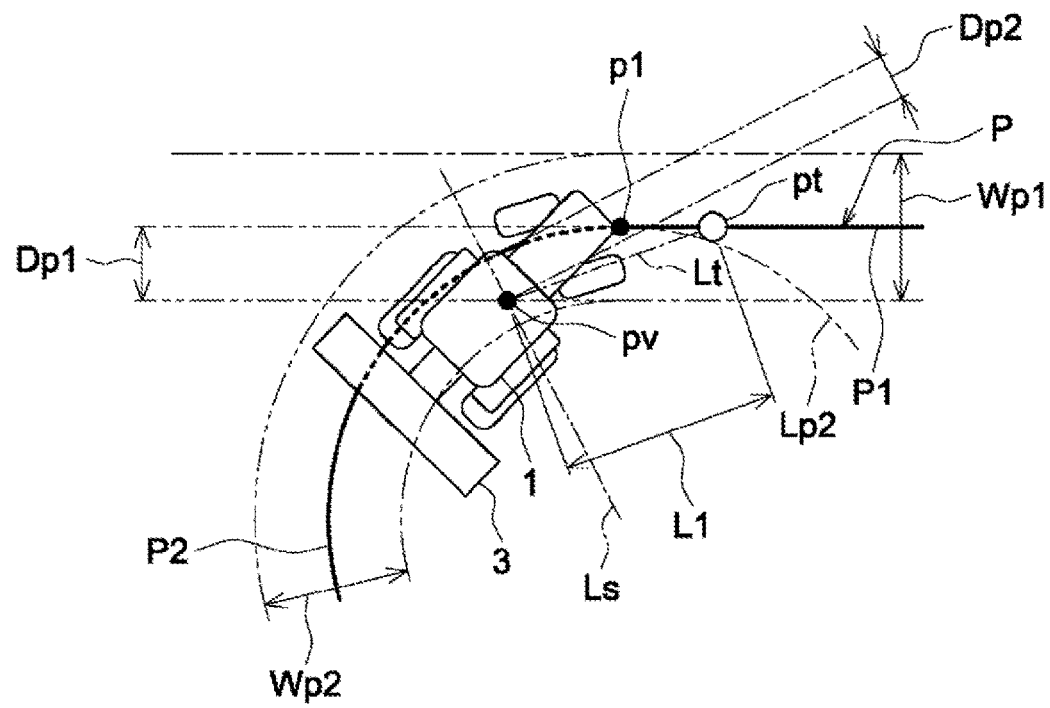
FIG. 18 is a view explaining a state in which the lateral deviation of the work vehicle relative to the straight path is within the allowable deviation range and the setting of the target travel position is changed to a position on the straight path.
Figure 20:
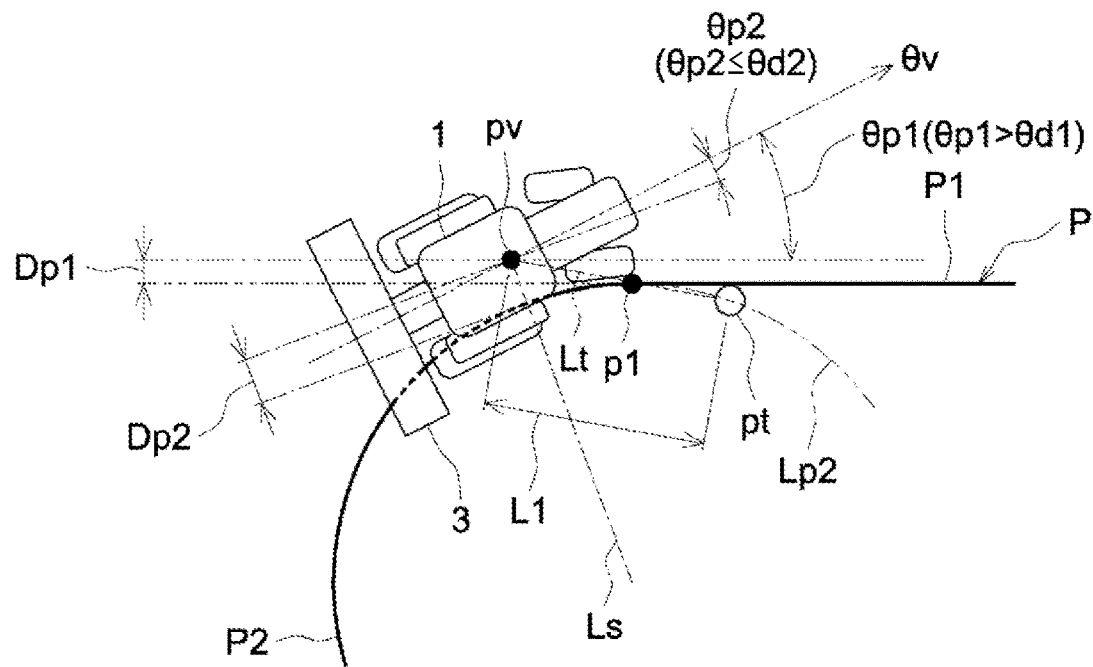
FIG. 20 is a view explaining a state in which the target angular deviation of the work vehicle relative to the straight path exceeds the allowable deviation angle and the target travel position is set at a position on the extension of the turning path.
Figure 21:
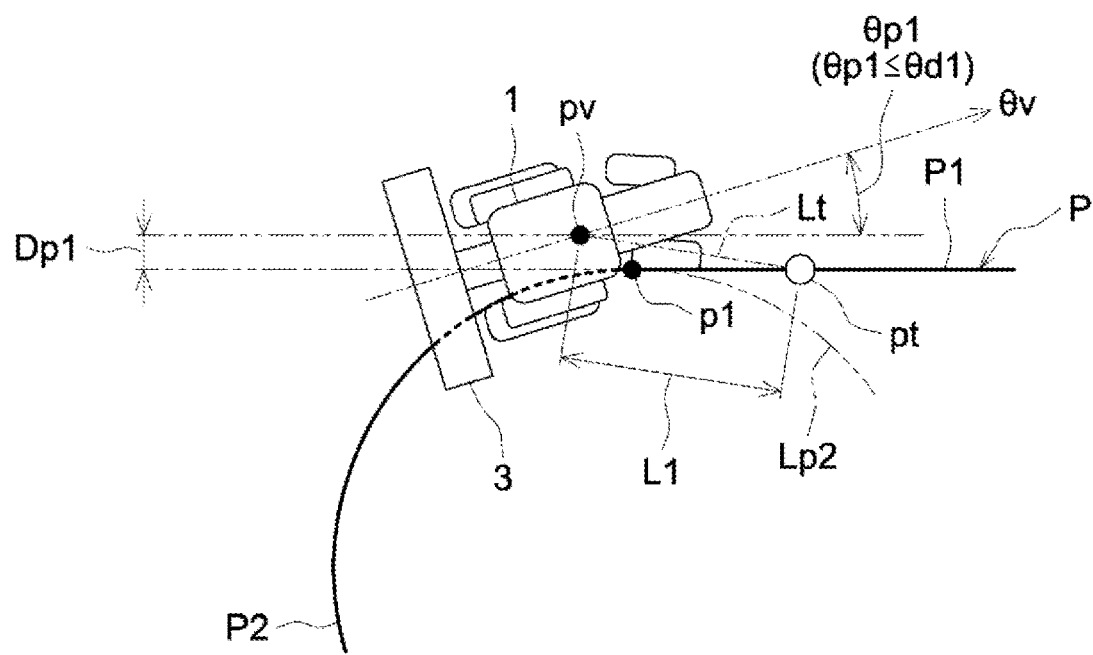
FIG. 21 is a view explaining a state in which the target angular deviation of the work vehicle relative to the straight path is within the allowable deviation angle, and the setting of the target travel position is changed to a position on the straight path.

If the lateral deviation Dp1 relative to the straight path P1 exceeds the allowable deviation width Wp1 in the first determination processing (see FIG. 16), or if the target angle deviation θp1 of tractor 1 relative to the straight path P1 exceeds the allowable deviation angle θd1 in the second determination processing (see FIG. 19), the target position setting unit 23Fa performs first setting change prohibition processing to prohibit execution of the first setting change processing, and second setting change processing to change the target travel position pt from the position on the change of direction path P2 to the position on the extension line Lp2 of the change of direction path P2 (see steps #4 to #5, FIGS. 17 and 20).

Since the setting of the target travel position pt is not changed from the position on the change of direction path P2 to the position on the straight path P1 upon reaching the target travel position pt at the end position p1 of the change of direction path P2, if the lateral deviation Dp1 of the tractor 1 relative to the straight path P1 exceeds the allowable deviation width Wp1, or if the target angle deviation θp1 of tractor 1 relative to the straight path P1 exceeds the allowable deviation angle θd1, it is possible to prevent the occurrence of inconvenience of the unnecessary emergency stop of the tractor 1 by the control operation of the emergency stop unit 23Fg due to the setting change described above.

Furthermore, the travel state of the tractor 1 can be maintained in the turning travel state for turning along the change of direction path P2, allowing the tractor 1 to approach the straight path P1 and reducing the lateral deviation Dp1 of the tractor 1 relative to the straight path P1.

After performing the second setting change processing, the target position setting unit 23Fa returns to the first determination processing of step #1.

The allowable deviation width Wp1 relative to the straight path P1 is set to be the same length as the allowable deviation width Wp2 relative to the change of direction path P2. The allowable deviation angle θd1 relative to the straight path P1 is set to be the same angle as the allowable deviation angle θd2 relative to the change of direction path P2.

Thus, during the automatic travel of the tractor 1 along the change of direction path P2, when the lateral deviation Dp2 of the tractor 1 relative to the change of direction path P2 is maintained within the allowable deviation width Wp2, and the allowable deviation angle θd1 is maintained within the allowable deviation width θd2 of the tractor 1 relative to the change of direction path P2, the lateral deviation Dp1 of the tractor 1 relative to the straight path P1 does not exceed the allowable deviation width Wp1, and the target angle deviation θp1 of the tractor 1 relative to the straight path P1 does not exceed the allowable deviation angle θd1, until the tractor 1 reaches the end position p1 of the change of direction path P2.

As a result, the setting of the target travel position pt can be changed from the position on the change of direction path P2 to the position on the straight path P1 without causing the inconvenience of the unnecessary emergency stop of the tractor 1 by the control operation of the emergency stop unit 23Fg, and the travel state of the tractor 1 can be switched from the straight travel state for traveling straight along the straight path P1 from the turning travel state for turning along the change of direction path P2.

OTHER EMBODIMENTS

Other embodiments of the present invention will be described.

Other embodiment described below can be configured to be applied independently, or may also be applied in combination with the configurations of different embodiments.

(1) Various modifications are possible in the configuration of the work vehicle 1.

For example, the work vehicle 1 may be configured in a semi-crawler specification using left and right crawlers instead of the left and right rear wheels 11, as well as the left and right front wheels 10, as the traveling device.

For example, the work vehicle 1 may be configured in a full crawler specification using left and right crawlers instead of the left and right front and rear wheels 10, 11, as the traveling device.

For example, the work vehicle 1 may be configured in a rear wheel steering specification using the left and right rear wheels 11 functioning as the steering wheels.

For example, the work vehicle 1 may be configured in an electrically powered specification using an electric motor instead of the engine 14.

For example, the work vehicle 1 may be configured in a hybrid specification with the engine 14 and the electric motor.

(2) The steering unit 17 may be a transmission device that enables differential movement of the left and right crawlers when they are provided as an example of the traveling device.

(3) The automatic steering control unit 2311 may be configured to include a drive speed calculation unit that calculates a target drive speed of the left and right crawlers, when they are provided as an example of the traveling device, in accordance with the azimuth angle deviation θa calculated by the azimuth angle deviation calculation unit 23Fd.

(4) The emergency stop unit 23Fg may be configured to execute the emergency stop of the work vehicle 1 only when the lateral deviation Dp1, Dp2 of the work vehicle 1 relative to the target path P (straight path P1 or change of direction path P2) for determining deviation of the target path P on which the target travel position pt is set exceeds the allowable deviation width Wp1, Wp2.

(5) The emergency stop unit 23Fg may be configured to execute the emergency stop of the work vehicle 1 only when the target angle deviation θp1, θp2 of the work vehicle 1 relative to the target path P (straight path P1 or change of direction path P2) for determining the deviation of the target path P on which the target travel position pt is set exceeds the allowable deviation angle θd1, θd2.

SUPPLEMENTARY NOTE OF THE INVENTION

In a second aspect of the present invention, the automatic steering control unit includes a lateral deviation calculation unit that calculates, in accordance with the target path and the current position, a deviation of the work vehicle in a lateral direction orthogonal to a deviation determination target path of the target path on which the target travel position is set, and an emergency stop unit that brings the work vehicle to an emergency stop when the lateral deviation exceeds an allowable deviation width relative to the deviation determination target path, and when it is determined that the target travel position has reached the end position of the turning path, the target position setting unit determines whether the lateral deviation exceeds the allowable deviation width relative to the straight path connected to the end position of the turning path, and when the lateral deviation exceeds the allowable deviation width, the target position setting unit prohibits a setting change of the target travel position from the position on the turning path to the position on the straight path.

With this structure, it is possible to prevent an occurrence of inconvenience of the unnecessary emergency stop of the work vehicle by the emergency stop unit, although the emergency stop would occur when the target position setting unit changes the setting of the target travel position from the position on the turning path to the position on the straight path even when the lateral deviation of the work vehicle relative to the straight path exceeds the allowable deviation range when the target travel position reaches the end of the turning path (the start position of the straight path).

This prevents a decrease in work efficiency due to the unnecessary emergency stop of the work vehicle, while enabling the emergency stop of the work vehicle when the work vehicle deviates from the allowable deviation width of the target path when the work vehicle works during the automatic travel.

In a third aspect of the present invention, the automatic steering control unit includes a target angle deviation calculation unit that calculates, in accordance with the target path, the current position, and the current azimuth, an angle formed between the current azimuth and an azimuth of a deviation determination target path of the target path on which the target travel position is set, and an emergency stop unit that brings the work vehicle to an emergency stop when the target angle deviation exceeds an allowable deviation angle relative to the deviation determination target path, and when it is determined that the target travel position has reached the end position of the turning path, the target position setting unit determines whether the target angle deviation exceeds the allowable deviation angle relative to the straight path connected to the end position of the turning path, and when the lateral deviation exceeds the allowable deviation width, the target position setting unit prohibits a setting change of the target travel position from the position on the turning path to the position on the straight path.

With this structure, it is possible to prevent an occurrence of inconvenience of the unnecessary emergency stop of the work vehicle by the emergency stop unit, although the emergency stop would occur when the target position setting unit changes the setting of the target travel position from the position on the turning path to the position on the straight path even when the target angle deviation of the work vehicle relative to the straight path exceeds the allowable deviation angle when the target travel position reaches the end of the turning path (the start position of the straight path).

This prevents a decrease in work efficiency due to the unnecessary emergency stop of the work vehicle, while enabling the emergency stop of the work vehicle when the work vehicle deviates from the allowable deviation angle of the target path when the work vehicle works during the automatic travel.

The invention claimed is:

1. An automatic travel system for a work vehicle, comprising:
    a steering unit that operates a travel device provided in the work vehicle;
    a positioning unit that measures a current position and a current azimuth of the work vehicle; and
    a control unit that makes the work vehicle travel automatically along a preset target path in accordance with positioning information from the positioning unit,
    wherein the target path includes a turning path and a straight path connected to the turning path, the control unit includes
    a target position setting unit that sets a target travel position at a predetermined position at a predetermined distance from the current position in a traveling direction during automatic travel, and
    an automatic steering control unit that controls an operation of the steering unit to allow the work vehicle to follow the target travel position in accordance with the positioning information from the positioning unit and the target travel position, and
    the target position setting unit determines whether the target travel position has reached an end position of the turning path connected to the straight path, and when it is determined that the target travel position has reached the end position of the turning path, the target position setting unit changes a setting of the target travel position from a position on the turning path to a position on the straight path.

2. The automatic travel system for the work vehicle according to claim 1, wherein the automatic steering control unit includes
    a lateral deviation calculation unit that calculates, in accordance with the target path and the current position, a deviation of the work vehicle in a lateral direction orthogonal to a deviation determination target path of the target path on which the target travel position is set, and
    an emergency stop unit that brings the work vehicle to an emergency stop when the lateral deviation exceeds an allowable deviation width relative to the deviation determination target path, and
    when it is determined that the target travel position has reached the end position of the turning path, the target position setting unit determines whether the lateral deviation exceeds the allowable deviation width relative to the straight path connected to the end position of the turning path, and when the lateral deviation exceeds the allowable deviation width, the target position setting unit prohibits a setting change of the target travel position from the position on the turning path to the position on the straight path.

3. The automatic travel system for the work vehicle according to claim 1, wherein
    the automatic steering control unit includes
    a target angle deviation calculation unit that calculates, in accordance with the target path, the current position, and the current azimuth, an angle formed between the current azimuth and an azimuth of the deviation determination target path of the target path on which the target travel position is set, as a target angle deviation, and
    an emergency stop unit that brings the work vehicle to an emergency stop when the target angle deviation exceeds an allowable deviation angle relative to the deviation determination target path, and
    when it is determined that the target travel position has reached the end position of the turning path, the target position setting unit determines whether the target angle deviation exceeds the allowable deviation angle relative to the straight path connected to the end position of the turning path, and when the target angle deviation exceeds the allowable deviation angle, the target position setting unit prohibits a setting change of the target travel position from the position on the turning path to the position on the straight path.

* * * * *